United States Patent [19]

Suzuki

[11] Patent Number: 5,541,741
[45] Date of Patent: Jul. 30, 1996

[54] IMAGE PROCESSING WITH ANTI-FORGERY PROVISION

[75] Inventor: Takashi Suzuki, Tokyo, Japan

[73] Assignee: Canon Kabushiki Kaisha, Tokyo, Japan

[21] Appl. No.: 951,087

[22] Filed: Sep. 25, 1992

[30] Foreign Application Priority Data

Sep. 30, 1991 [JP] Japan .................. 3-252219
Sep. 17, 1992 [JP] Japan .................. 4-247969

[51] Int. Cl.⁶ .................. H04N 1/387; G03G 21/00
[52] U.S. Cl. .................. 358/450; 355/201
[58] Field of Search .................. 358/448, 452, 358/450; 355/201

[56] References Cited

U.S. PATENT DOCUMENTS

| | | | |
|---|---|---|---|
| 4,472,050 | 9/1984 | Stockburger et al. | 355/201 X |
| 4,739,377 | 4/1988 | Allen | 355/133 |
| 4,891,666 | 1/1990 | Gordon | 355/201 X |
| 4,965,744 | 10/1990 | Wagetsuma et al. | 358/452 X |
| 5,091,746 | 2/1992 | Watanabe | 355/201 X |
| 5,119,213 | 6/1992 | Graves et al. | 358/488 |
| 5,132,729 | 7/1992 | Matsushita et al. | 355/203 |
| 5,144,455 | 9/1992 | Stein et al. | 358/443 |
| 5,216,724 | 6/1993 | Suzuki et al. | 355/201 X |
| 5,257,119 | 10/1993 | Funada et al. | 358/450 X |

FOREIGN PATENT DOCUMENTS

| | | | |
|---|---|---|---|
| 289047 | 4/1988 | European Pat. Off. | H04N 1/387 |
| 342060 | 5/1989 | European Pat. Off. | G03G 21/00 |
| 3229616 | 2/1984 | Germany | H04N 1/02 |

*Primary Examiner*—Peter S. Wong
*Assistant Examiner*—Randy W. Gibson
*Attorney, Agent, or Firm*—Fitzpatrick, Cella, Harper & Scinto

[57] ABSTRACT

Disclosed is an image processing apparatus having a discrimination function for identifying a specific original (e.g., a banknote). The apparatus inputs pattern data which is obtained by reading a specific original, stores the inputted pattern data, synthesizes the stored pattern data with inputted original image data, and stores the result.

11 Claims, 27 Drawing Sheets

| SIGNAL CNO | PRINTING OUTPUT |
|---|---|
| 0 | MAGENTA (M) |
| 1 | CYAN (C) |
| 2 | YELLOW (Y) |
| 3 | BLACK (BK) |

FIG. 16

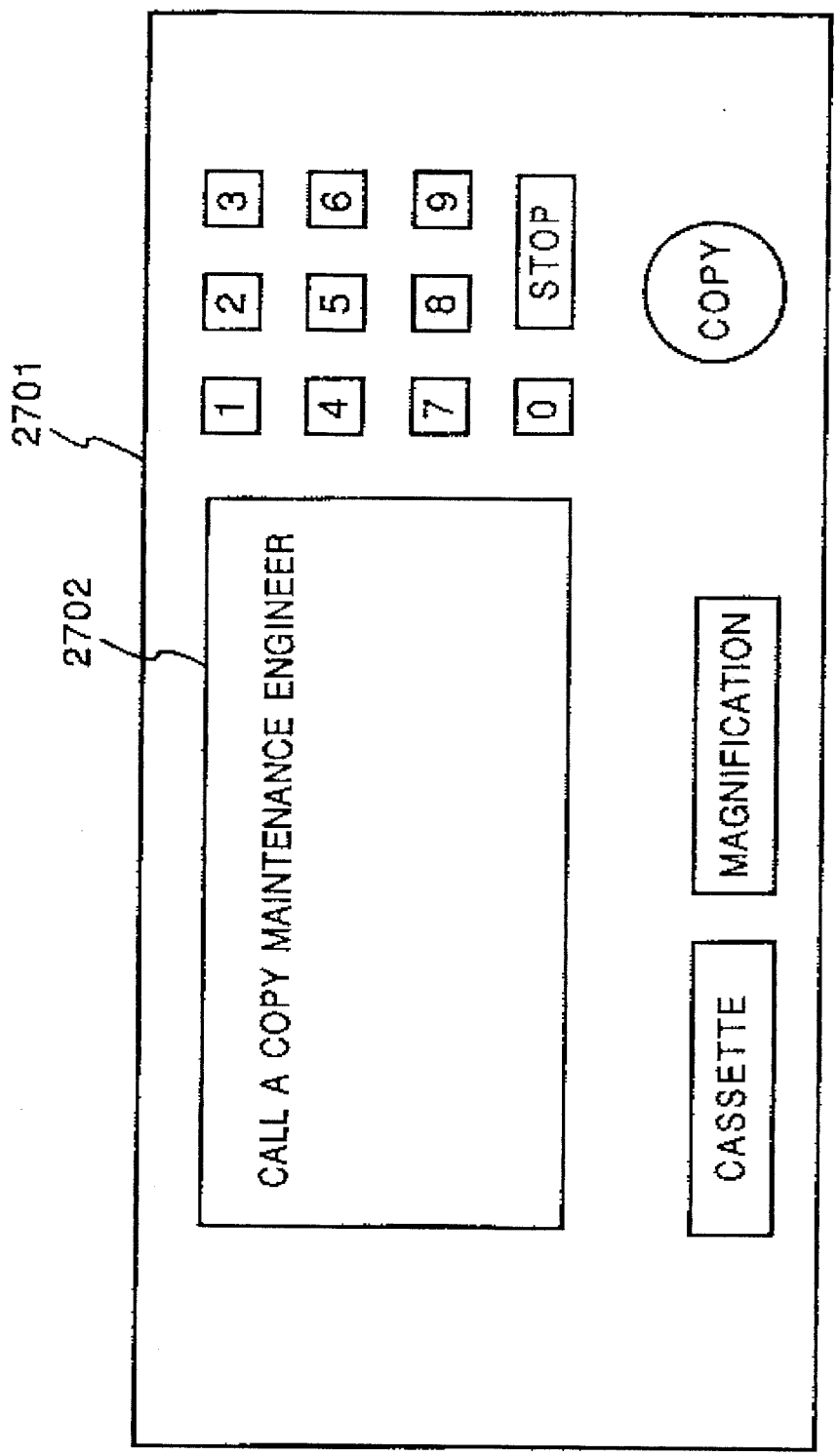

IMAGE PROCESSING WITH ANTI-FORGERY PROVISION

BACKGROUND OF THE INVENTION

1. Field of the Invention

This invention relates to an image processing apparatus and, more particularly, to an image processing apparatus having a function of adding a particular pattern to a reproduced image.

2. Description of the Related Arts

Copying machines capable of obtaining a multi-color copy having high image quality have been recently developed. The recent improvements in the picture quality of copying machines which now have a color capability have been accompanied by the fear of counterfeiting, in which specific originals such as bank notes and securities, which are not meant to be copied, are duplicated at such a high picture quality that the copies are almost indistinguishable from the originals. However, in the prior art, it was almost impossible to identify the copying machine used for counterfeiting or the user who misused the machine, from the duplicates.

In a case where an original which should not be copied has been copied for improper use, it is important to trace back to the copy user or abused copying machine.

To identify the copying machine used for copying, a method for adding a particular pattern to duplicates is suggested by the present applicant in U.S. Pat. No. 5,257,119 and U.S. Ser. No. 858,500.

However, there is the drawback that, if the function for adding a pattern is forged, the method cannot be fully functioned.

SUMMARY OF THE INVENTION

Accordingly, it is an object of the present invention to provide an image processing apparatus which can eliminate the above-described drawback in the prior arts.

It is another object of the present invention to provide an image processing apparatus capable of specifying the information on a copying machine used for copies, machine user, or a time copies are made in accordance with duplicates, in a case where an original which should not be copied is duplicated.

According to the present invention, the foregoing object is attained by providing an image processing apparatus comprising: storage means for storing pattern data inputted in accordance with a predetermined mode; and synthesizing means for synthesizing the pattern data stored in the storage means with inputted original image data and outputting the synthesized data.

It is another object of the present invention to provide an image processing apparatus comprising: reading means for reading a specific image and inputting pattern data; storage means for storing the pattern data inputted by the reading means; synthesizing means for synthesizing the pattern data stored in the storage means and inputted original image data; and recording means for recording a result of synthesizing by the synthesizing means.

It is another object of the present invention to provide an image processing apparatus comprising: reading means for reading a specific image and inputting image data; decoding means for decoding the image data which is inputted by the reading means; conversion means for converting the inputted image data into pattern data in accordance with a result of decoding by the decoding means; storage means for storing the pattern data converted by the conversion means; synthesizing means for synthesizing the pattern data stored in the storage means and inputted original image data; and recording means for recording a result of synthesizing by the synthesizing means.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 16 is a diagram illustrating a relationship between the signal CNO and the printing output in accordance with the first embodiment;

FIG. 27 is the operation section of the second embodiment.

DESCRIPTION OF THE PREFERRED EMBODIMENTS

Preferred embodiments of the present invention will now be described in detail in accordance with the accompanying drawings.

Copying machines will be described as embodiments of the present invention, however, it goes without saying that this does not impose a limitation upon the present invention, for the present invention is applicable also to any other kind of apparatus. In the present invention, the possible counterfeits includes bank notes, securities and originals of confidential documents.

<First Embodiment>

[General View of the Apparatus]

Figure 2:
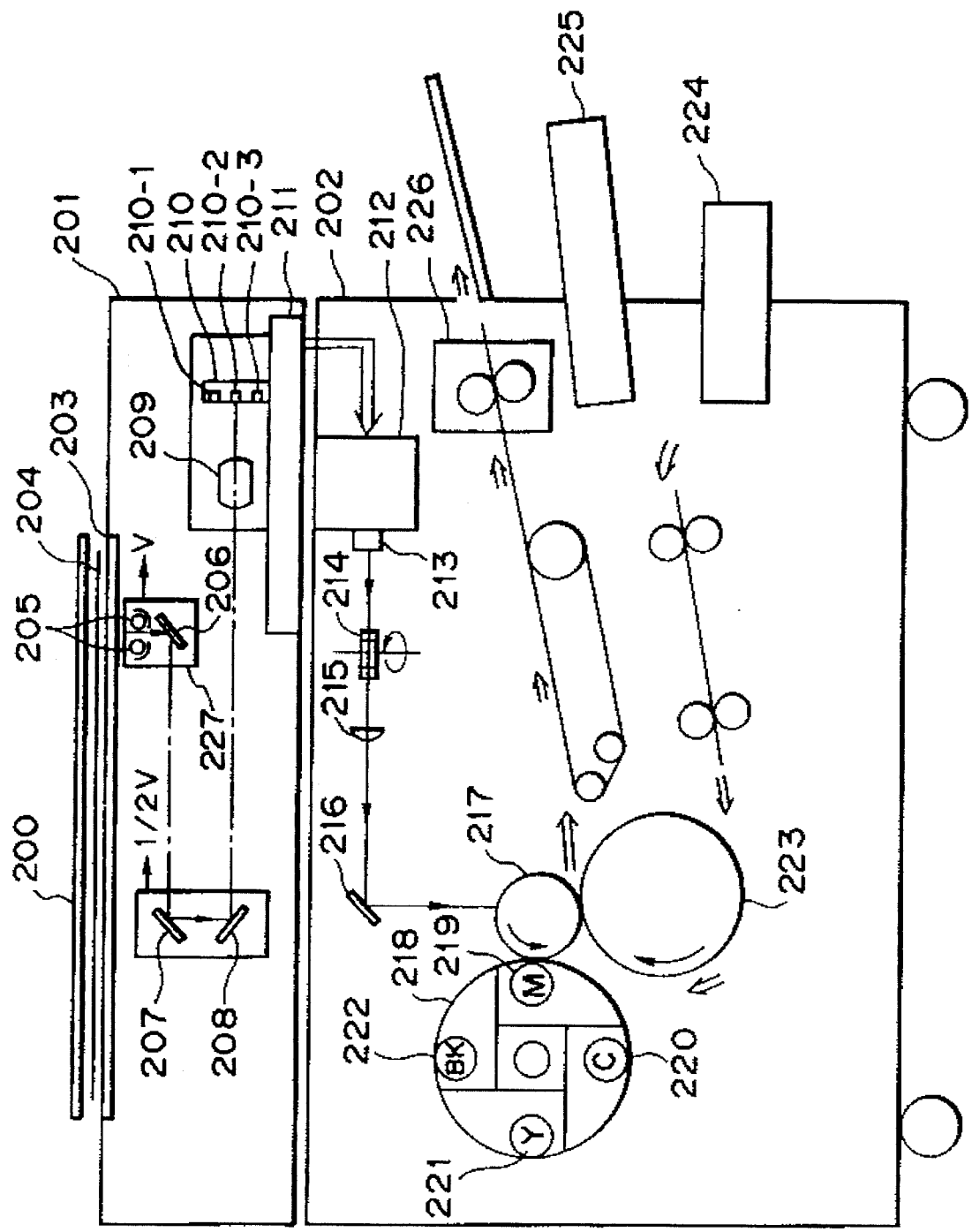
FIG. 2 is a sectional side view of the construction of a copying machine in accordance with the first embodiment of the present invention.

FIG. 2 is a sectional side view showing the construction of a copying machine in accordance with the first embodiment of the present invention. Numeral 201 denotes an image scanning section 201 which reads an original at a resolution of 400 dpi (dots/inch) and processes a digital signal. Numeral 202 denotes a printing section 202 which prints a full-color image corresponding to the original image read by the image scanning section 201 on a print sheet at a resolution of 400 dpi.

The image scanning section 201 includes a pressure plate having a mirror surface 200. An original 204 on a glass table (platen) 203 is irradiated by means of lamps 205, an image is formed on a three-line sensor (hereinafter referred to as a "CCD") 210 via mirrors 206, 207, and 208 and a lens 209, and the image is sent to a signal processor 211 as full-color information red (R), green (G) and blue (B) components. The entire original is scanned (sub-scanning) by mechanically moving the carriage 227 fixing the lamps 205 and mirror 206 at a velocity v as well as the mirrors 207, 208 at a velocity ½ v in a in a direction perpendicular to the electrical scanning direction of the line sensor (a main scanning direction).

The signal processor 211 electrically processes the read image signal, separates the signal into magenta (M), cyan (C), yellow (Y), and black (BK) components and sends these components to the printing section 202. At least one component among the M, C, Y, BK components is sent to the printing section 202 per scan of the original in the image scanning section 201, and a single print-out is completed by a total of four scans of the original.

Each image signal M, C, Y or BK received from the image scanning section 201 is sent to a laser driver 212. The laser driver 212 modulates and drives a semiconductor laser 213 in accordance with the received image signal. The laser light is made to scan across a photosensitive drum 217 via a polygonal mirror 214, an f-θ lens 215 and a mirror 216. Numeral 218 represents a revolving developer comprising a magenta developing section 219, a cyan developing section 220, a yellow developing section 221 and a black developing section 222. These four developing sections come into alternate contact with the photosensitive drum 217 so that an electrostatic image formed on the photosensitive drum is developed by means of toners. Numeral 223 represents a transfer drum upon which paper fed from a paper cassette 224 or 225 is wound so that the image developed on the photosensitive drum 217 may be transferred to the paper.

After four colors M, C, Y and BK have thus been transferred successively, the paper is ejected through a fixing unit 226.

[Image Scanner Unit]

Figure 1:
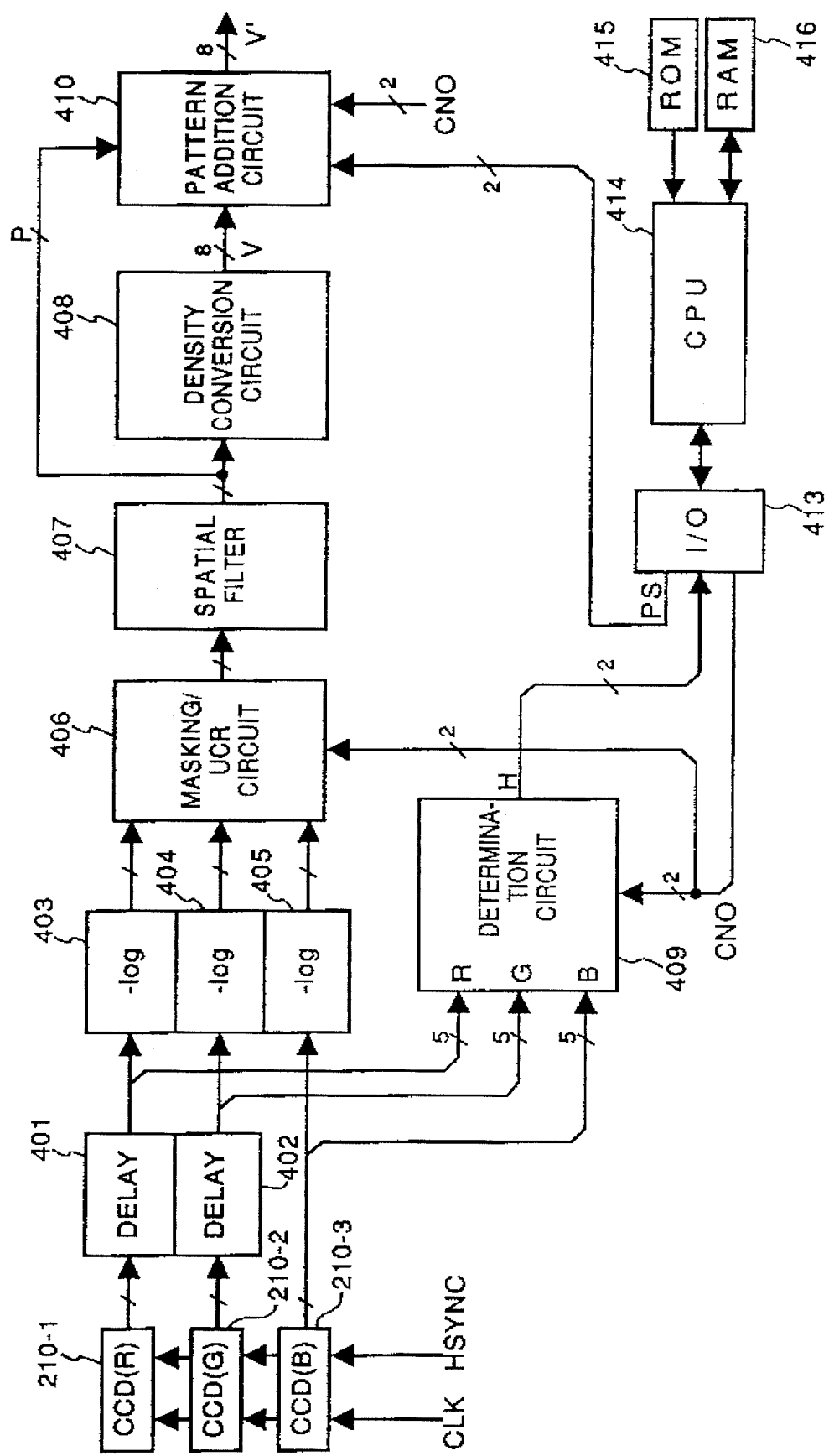
FIG. 1 is a block diagram of the construction of an image scanner 201 in accordance with a first embodiment of the present invention.

FIG. 1 is a block diagram of the construction of the image scanning section 201 according to the first embodiment. Numerals 210-1, 210-2, and 210-3 denote CCD line sensors (solid image pick-up elements) having spectroscopic sensitivity characteristics such as to be sensitive to red (R), green (G) and blue (B), respectively. After the A/D conversion, an eight-bit signal having a value of 0 to 255 is outputted.

Since the CCD line sensors 210-1, 210-2, and 210-3 used in the first embodiment are placed at regular intervals, relative spatial deviations thereof are corrected by delay elements 401 and 402.

Numeral 403, 404, and 405 denote logarithmic converters (log converters) comprising look-up table ROMs or RAMs which convert a luminance signal into a density signal. Numeral 406 denotes a masking/UCR (under color removal) circuit. The detail description is omitted here since this type of circuit is well known. Generally, when each of the signals of M, C, Y and BK for output is read according to three input signals, the signal is outputted as a signal having a predetermined bit length, namely 8 bits, in a frame-sequential order.

Numeral 407 denotes a spatial filter circuit which corrects the characteristics of spatial frequencies of an output signal (MTF). Numeral 408 denotes a density conversion circuit which corrects density characteristics of the printing section 202. The density conversion circuit 408 comprises ROMs or RAMs which are similar to those of the log converters 403 to 405.

Numeral 414 denotes a microcomputer (hereinafter referred to as a "CPU") for controlling the present apparatus. Numeral 415 denotes a ROM storing a program which operates the CPU 414. Numeral 416 represents a RAM which is used as a work area for executing various programs. Numeral 413 represents an input/output port (hereinafter referred to as an "I/O port") connected to the CPU 414. Numeral 409 represents a determination circuit which discriminates a specific original.

The determination circuit 409 discriminates a possibility that the original placed on the original table is at least one of plurality of specific originals. The determination signal H is outputted in two bits. If there is a strong possibility that the original is one of the specific originals, H="3" is outputted. On the other hand, if the possibility is rare, H="0" is outputted. The determination circuit 409 further comprises a thinning-out circuit 301 which performs a thinning-out processing of the inputted signals R, G, B and a frequency dividing circuit 310, which are described later with reference to FIG. 3.

A signal CNO is a two-bit frame-sequential signal which is a control signal indicating the order of the four reading operations (scanning operations) with respect to four output colors M, C, Y, and BK for each color image. FIG. 16 shows the relation between the signal CNO and the printing output according to the first embodiment. The signal CNO is generated by the CPU 414 through the I/O port 413 to change conditions for the operation of the masking UCR circuit 406. The signal CNO is also inputted to the determination circuit 409 to change the determination criteria with respect to the four reading operations and thus discrimination on a different specific original can be performed.

Numeral 410 denotes a pattern addition circuit at which a pattern which cannot easily be discriminated with human eyes is added to a duplicate image corresponding to a two-bit pattern level selection signal PS designated by the CPU 414. The pattern to be added is generated from the image signal P read by the reader.

[Timing Chart]

Figure 4:
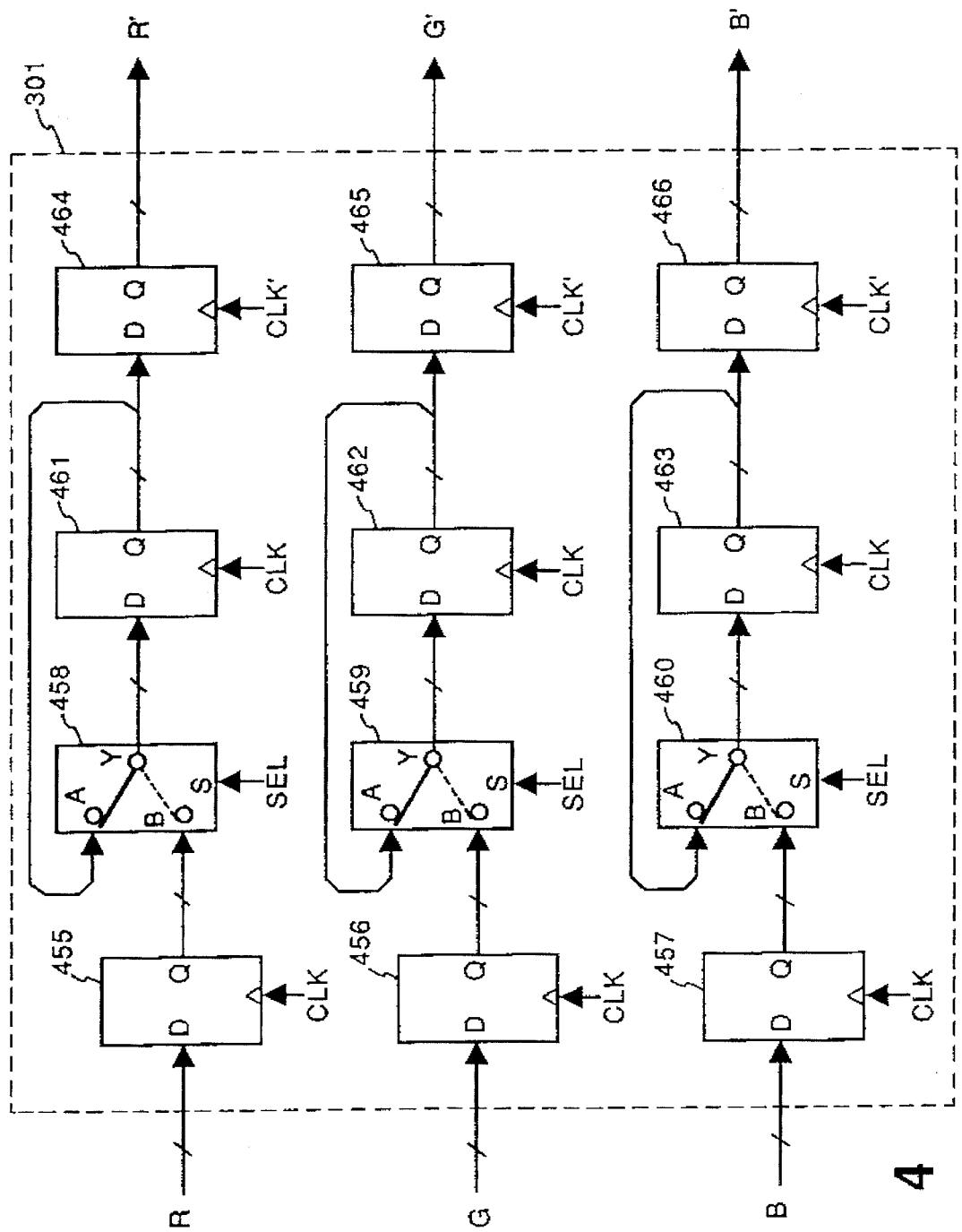
FIG. 4 is a block diagram of the construction of a thinning-out circuit of the first embodiment.
Figure 5:
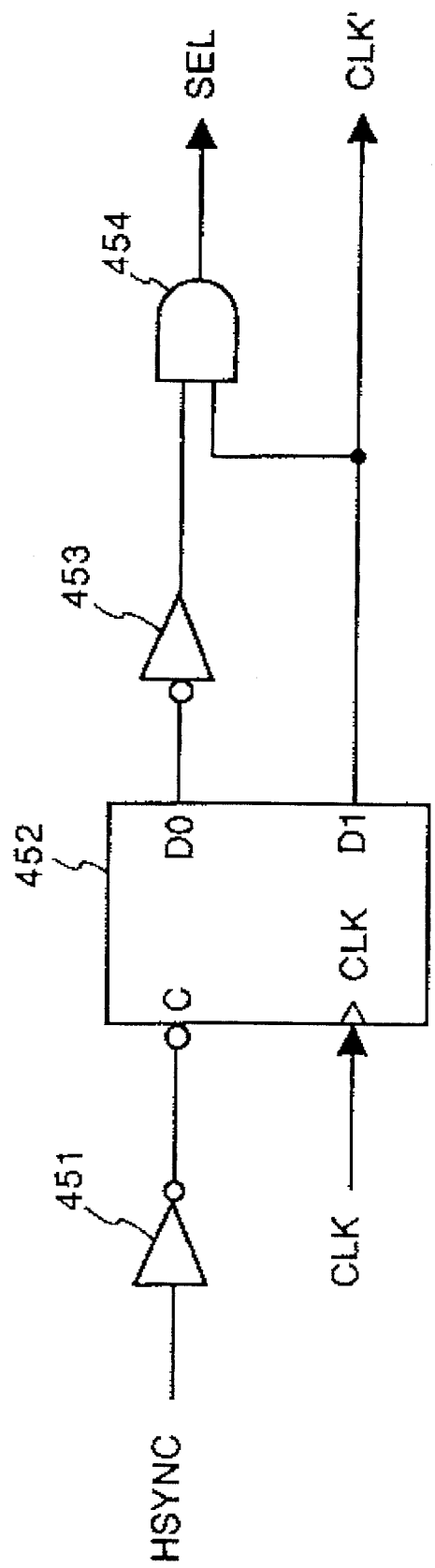
FIG. 5 is a block diagram of the construction of a frequency dividing circuit of the first embodiment.
Figure 7:
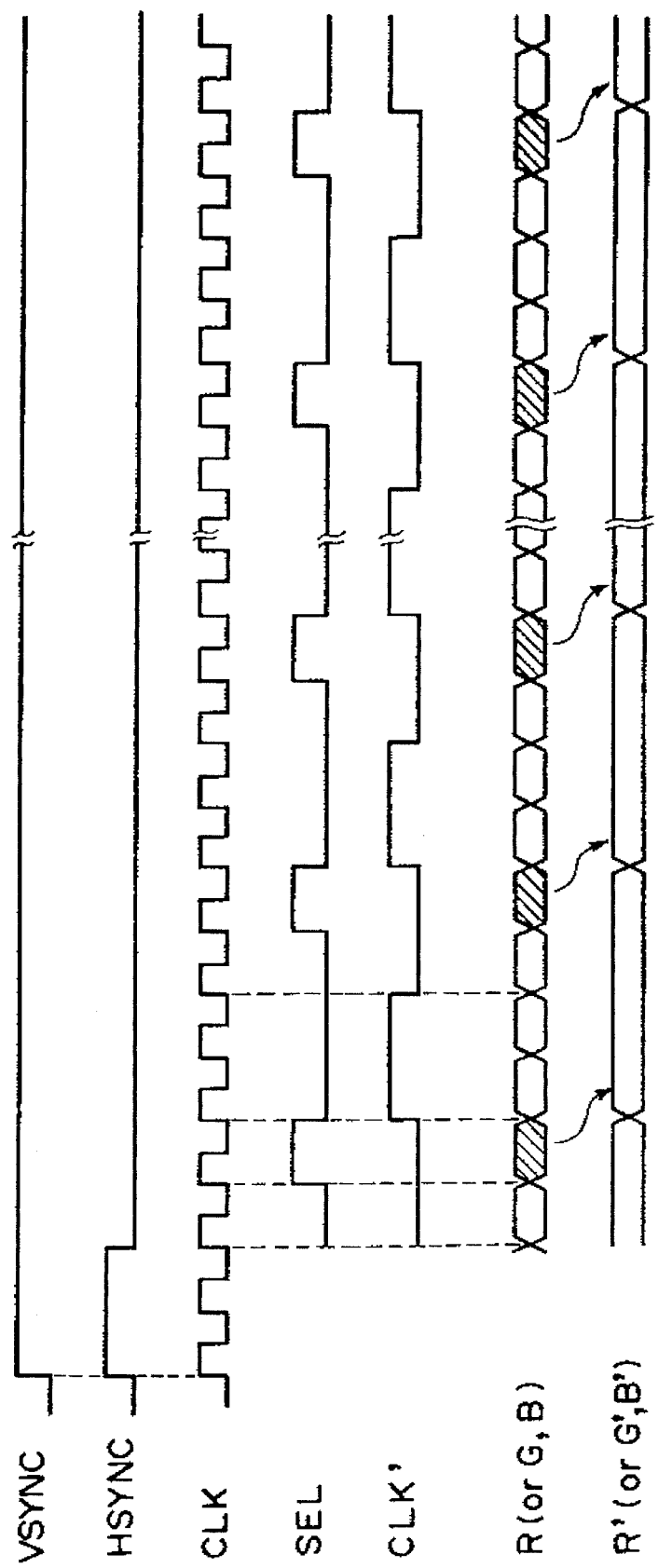
FIG. 7 is a timing chart of a signal in the main scanning direction in accordance with the first embodiment.

FIG. 4 is a block diagram of the construction of the frequency dividing circuit 310 in accordance with the first embodiment. FIG. 5 is a block diagram of the construction of the frequency dividing circuit 310 in accordance with the first embodiment. FIG. 7 is a timing chart of various signals with respect to the main scanning direction in accordance with the first embodiment.

A signal VSYNC is a sub-scanning period signal which indicates an image output period of sub scanning. A signal HSYNC is a main scanning synchronizing signal for synchronizing the start of the main scanning. CLK represents an image transfer clock which is a master clock for various image processings in the first embodiment.

On the other hand, CLK' represents a clock which is obtained by dividing the frequency of the CLK by 4 to be used as a master clock for the determination circuit 409. A signal SEL is a timing signal for use in the thinning-out circuit 301. The clock CLK' and signal SEL are generated by the frequency dividing circuit 310 shown in FIG. 5.

The thinning-out circuit 301 and the frequency dividing circuit 310 will now be described below.

In FIG. 4, numerals 455 to 457, and 461 to 466 represent flip flops and numerals 458 to 460 represent selectors. In FIG. 5, numerals 451 and 453 represent inverters, numeral 452 represents a two-bit counter, and numeral 454 represents an AND gate.

The flip flops 455, 456, 457, 461, 462, 463 and the selectors 458, 459 460 hold data at the timing of the clock CLK while the flip flops 464, 465, and 466 hold data at the timing of the clock CLK'.

In the frequency dividing circuit 310, the two-bit counter 452 is cleared (initialized) by the signal HSYNC which is the main scanning synchronizing signal, counts the CLK thereafter, and outputs the count value in two bit (D0, D1). The upper bit D1 of these count values is outputted as CLK', and a logical product of an inverted signal of the lower bit D0 and the upper bit D1 is outputted as a signal SEL.

Consequently, in the thinning-out circuit 301, the signal R (G, or B) transferred at CLK is thinned out at a rate of ¼ and is synchronized with CLK' to obtain a signal R' (G', or B') as shown in FIG. 7.

[Discrimination Circuit]

Figure 3:
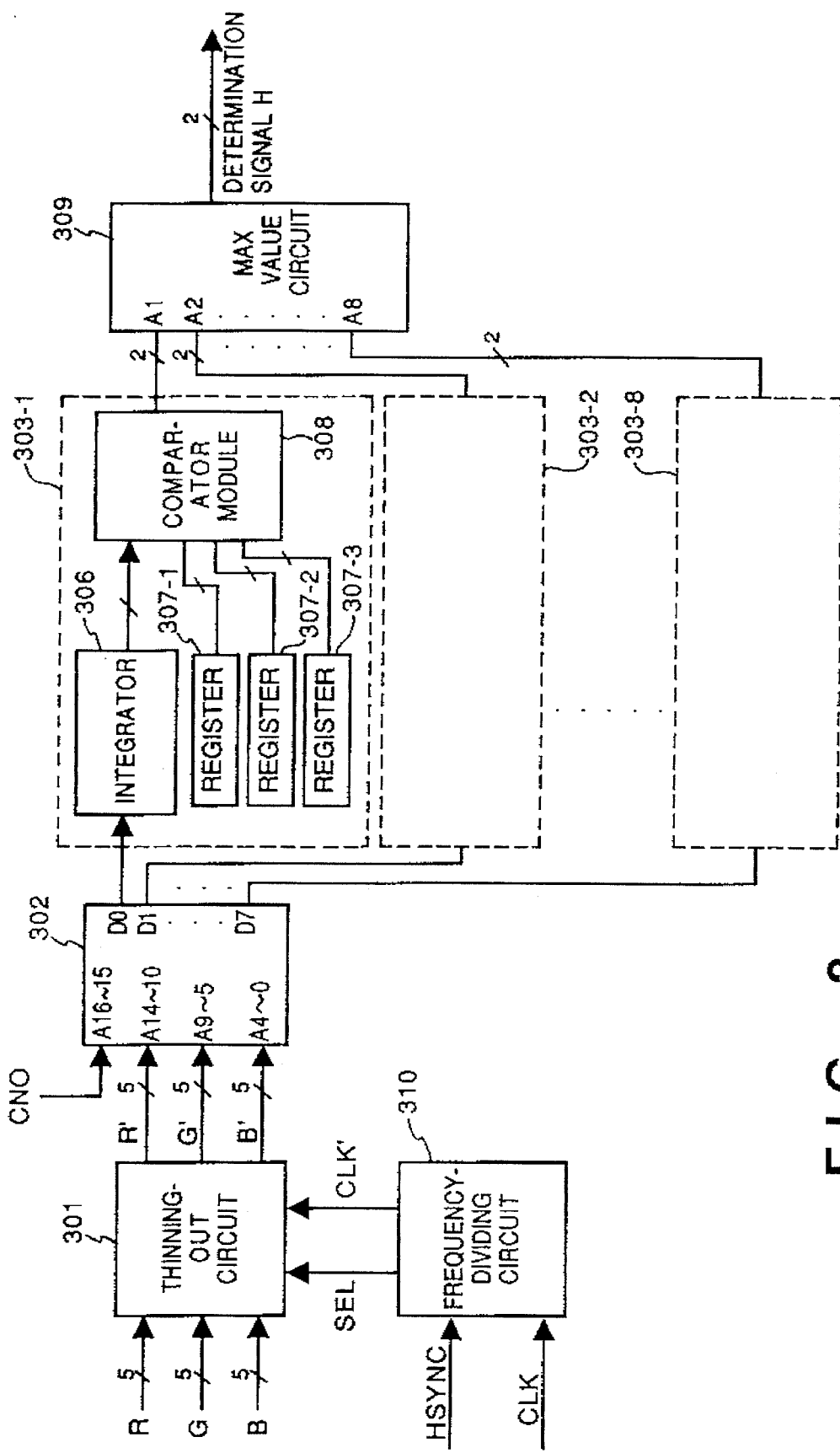
FIG. 3 is a block diagram of the construction of a determination circuit 409 of the first embodiment.

FIG. 3 is a block diagram of the construction of the determination circuit 409 in accordance with the first embodiment. The thinning-out circuit 301 shown in FIG. 4 thins out data to reduce the load on the processing circuit of the determination circuit 409. Numeral 302 represents a color-matching look-up table RAM (hereinafter referred to as a "LUT") which performs color matching between each of a plurality of specific originals (securities, bank notes, etc.) and inputted data. The LUT 302 investigates color distribution with regard to 32 specific originals in advance and holds the results of judgment such as the bit information when the color of a pertinent pixel coincides with a color of the specific original and when the color does not coincide with the color of the specific original. The number 32 as the total of specific originals applies in the case where the judgment of eight types of specific originals are respectively assigned to four scanning operations for M, C, Y, and BK.

In the LUT 302, the signal CNO, which is a frame-sequential signal, is inputted to the two higher order address bits, and five higher order bits of the thinned-out image signal of each of the colors R, G, B are inputted to the 15 lower order address bits. In each of the signal CNO values 0 to 3, whether the color tone of the pertinent pixel coincides with the color tone of the 8 specific originals is simultaneously outputted in correspondence with the 8-bit data. Accordingly, determination is made with respect to the 32 specific originals by four cycles of read scanning.

Numerals 303-1, 303-2, . . . , 303-8 shown in FIG. 3 represent a color tone determination circuit constituted of the same hardware. Each circuit comprises an integrator 306, registers 307 and a comparator module 308, determines a possibility of the existence of a specific original in the read originals, and outputs a 2-bit determination result. Numeral 309 represents a maximum value circuit which outputs a maximum value among the determination results outputted from the color tone determination circuits 303-1, 303-2, . . . , 303-8. That is, the determination result corresponding to one of the 8 specific originals which is the most probable to exist is outputted.

[Integrator]

Figure 6:
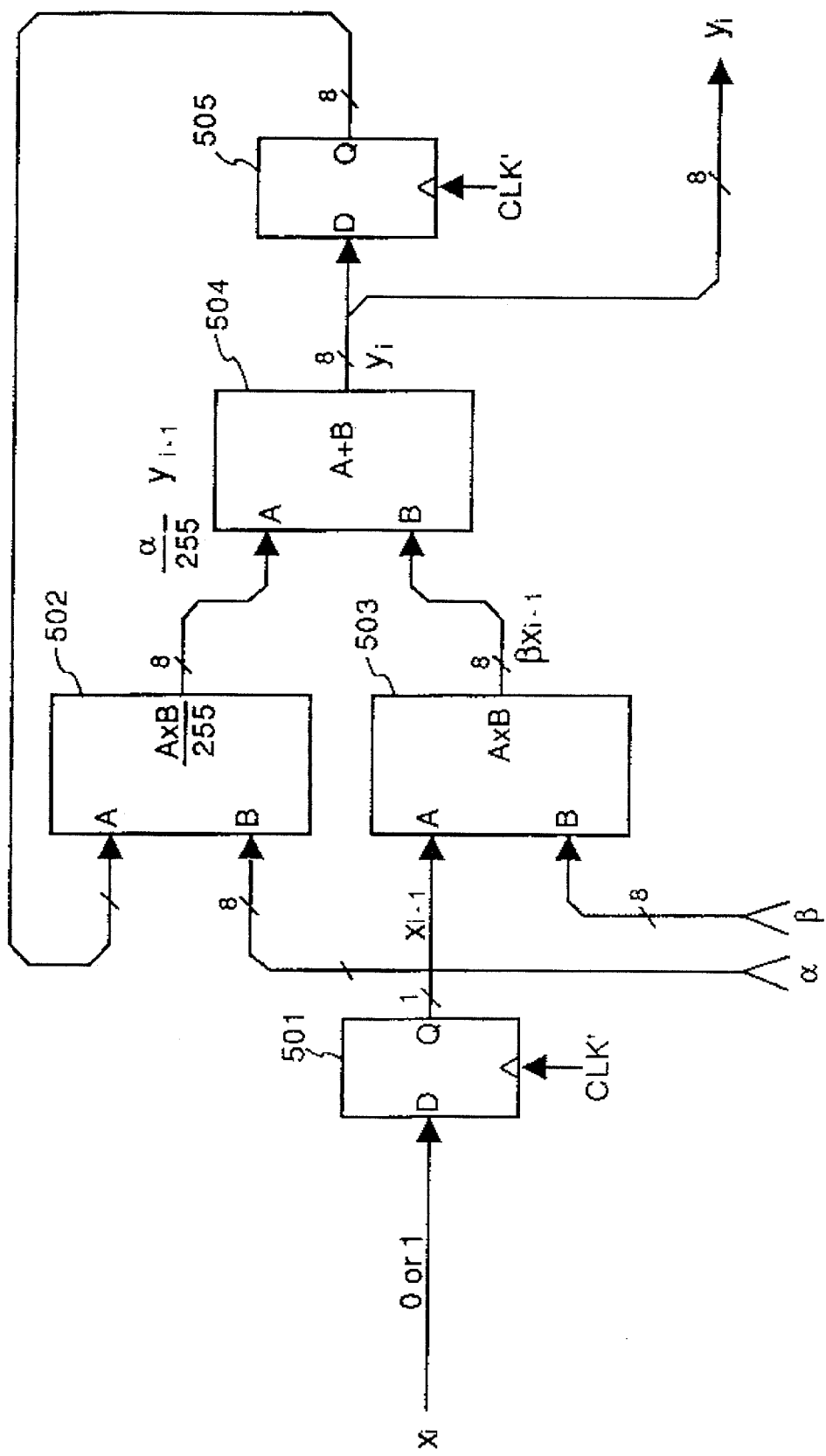
FIG. 6 is a block diagram of the construction of an integrator 306 of the first embodiment.
Figure 8:
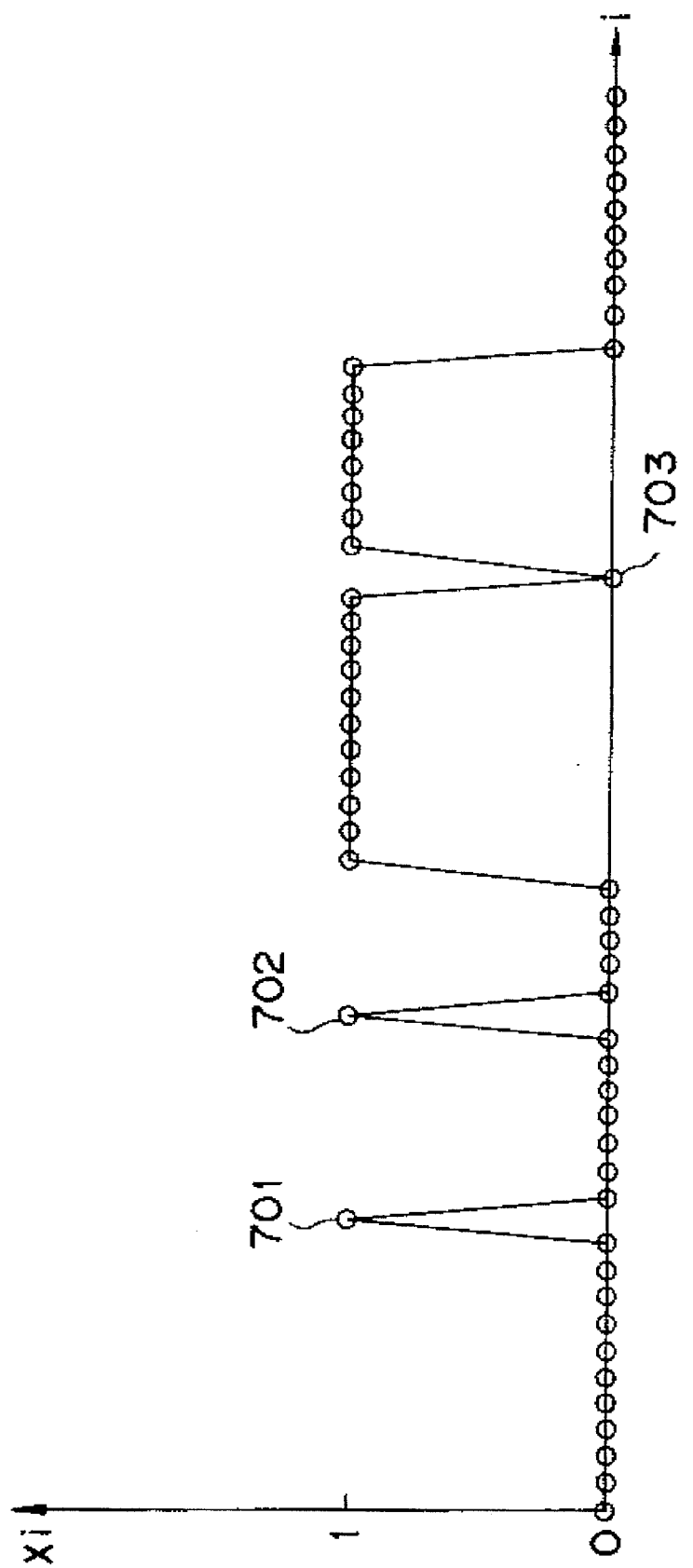
FIGS. 8 and 9 are diagrams of examples of input/output of the integrator 306 of the first embodiment.
Figure 9:
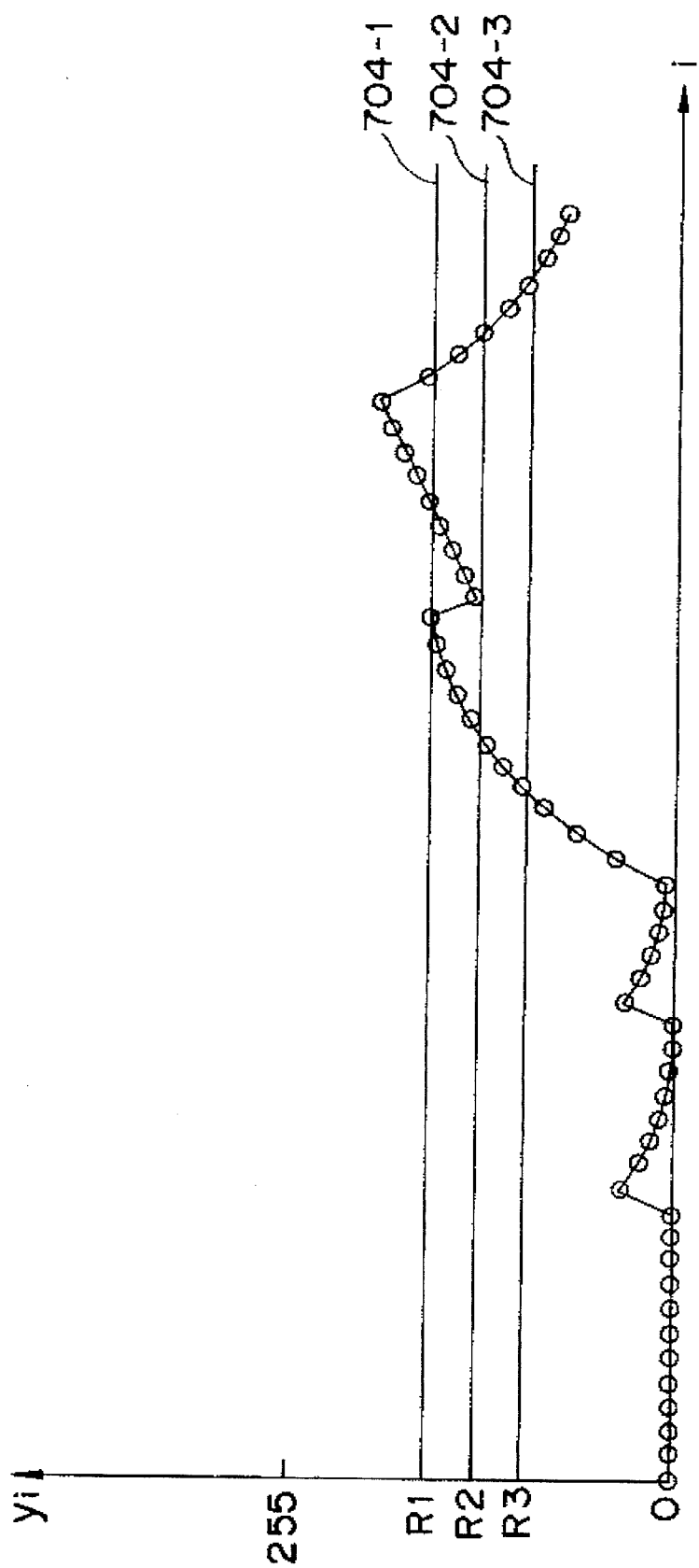

FIG. 6 is a block diagram of the construction of the integrator 306 in accordance with the first embodiment, FIG. 8 is a diagram of an example of an output from the integrator 306, and FIG. 9 is a diagram of an example of am input to the integrator 306.

Numerals 501 and 505 shown in FIG. 5 represent flip flops which hold data at the timing of the leading edge of a clock signal CLK'. Numeral 502 represents a multiplier to which two eight-bit signals (A, B) are inputted. The multiplier 502 multiplies these signals and outputs an eight-bit signal (A×B/255) as the result. Numeral 503 represents a multiplier to which a one-bit input signal (A) and an eight-bit input signal (B) applied. The multiplier 503 multiplies these signals and outputs an eight-bit output signal (A×B) as the result. Numeral 504 represents an adder to which two eight-bit input signals (A, B) are inputted. The adder 504 adds these signals and outputs an eight-bit signal (A+B) as the result.

Consequently, in the operation of the integrator 306, an 8-bit output signal yi with respect to a binary input signal xi is expressed by the following equation when a binary input signal xi is applied:

$$y_i = (\alpha/255) \cdot y_{i-1} + \beta \cdot x_{i-1} \qquad (1)$$

where values α and β in this equation are predetermined constants. The various characteristics of the integrator 306 are determined by these values.

For example, when α=247 and β=8, an output yi of the kind shown in FIG. 9 is outputted in response to an input xi of the kind shown in FIG. 8.

An input which is "1" despite the fact that almost all values peripheral thereto are "0", as in the manner of points 701, 702, is considered to be noise. Similarly, an input which is "0" despite the fact that almost all values peripheral thereto are "1", as in the manner of point 703, is considered to be noise. This is processed by the integrator 306, an appropriate threshold value such as values 704-1 (R1), 704-2 (R2), and 704-3 (R3) in the registers 307 shown in FIG. 3 is set, and the output yi of the integrator 306 is binarized based upon this threshold value, thereby making it possible to eliminate the noise.

[Comparator Module]

Figure 10:
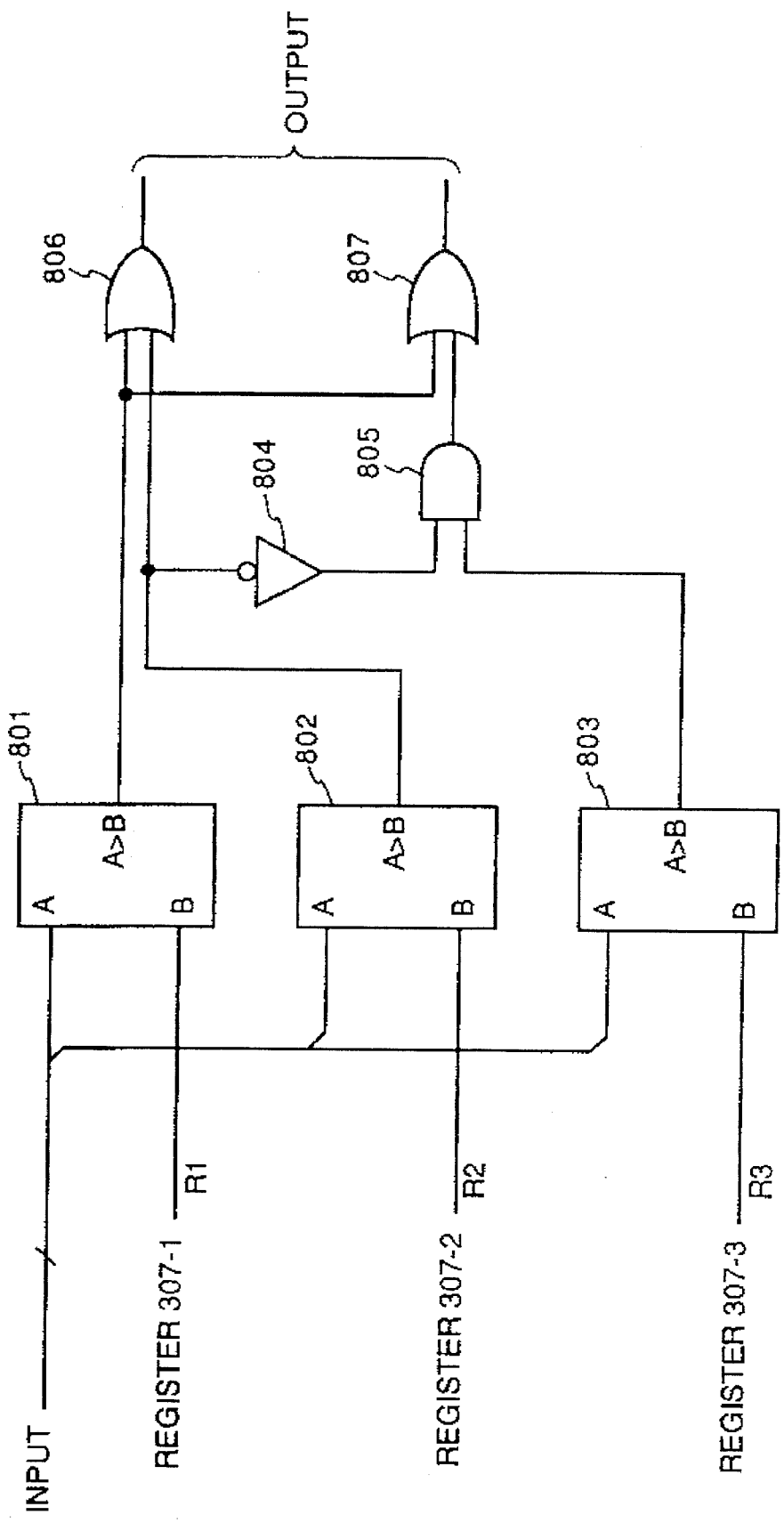
FIG. 10 is a block diagram of the construction of a comparator module 308 of the first embodiment.

FIG. 10 is a block diagram of the construction of the comparator module 308 according to the first embodiment. In FIG. 10, numerals 801, 802, and 803 represent comparators, numeral 804 represents an inverter, numeral 805 represents an AND gate, and numerals 806 and 807 represent OR gates. Threshold values R1, R2, and R3 mentioned above with reference to FIG. 3 are previously set in the registers 307-1, 307-2, and 307-3, respectively. The relation such as R1>R2>R3 is established. Accordingly, the determination result is quantized into 2 bits and output ted. That is:

OUTPUT=11 (binary) is outputted if R1<(input),
OUTPUT=10 (binary) is outputted if R2<(input)≦R1,
OUTPUT=01 (binary) is outputted if R3<(input)≦R2, and
OUTPUT=00 (binary) is outputted if (input)<R3.

[Pattern Addition Circuit]

Figure 11:
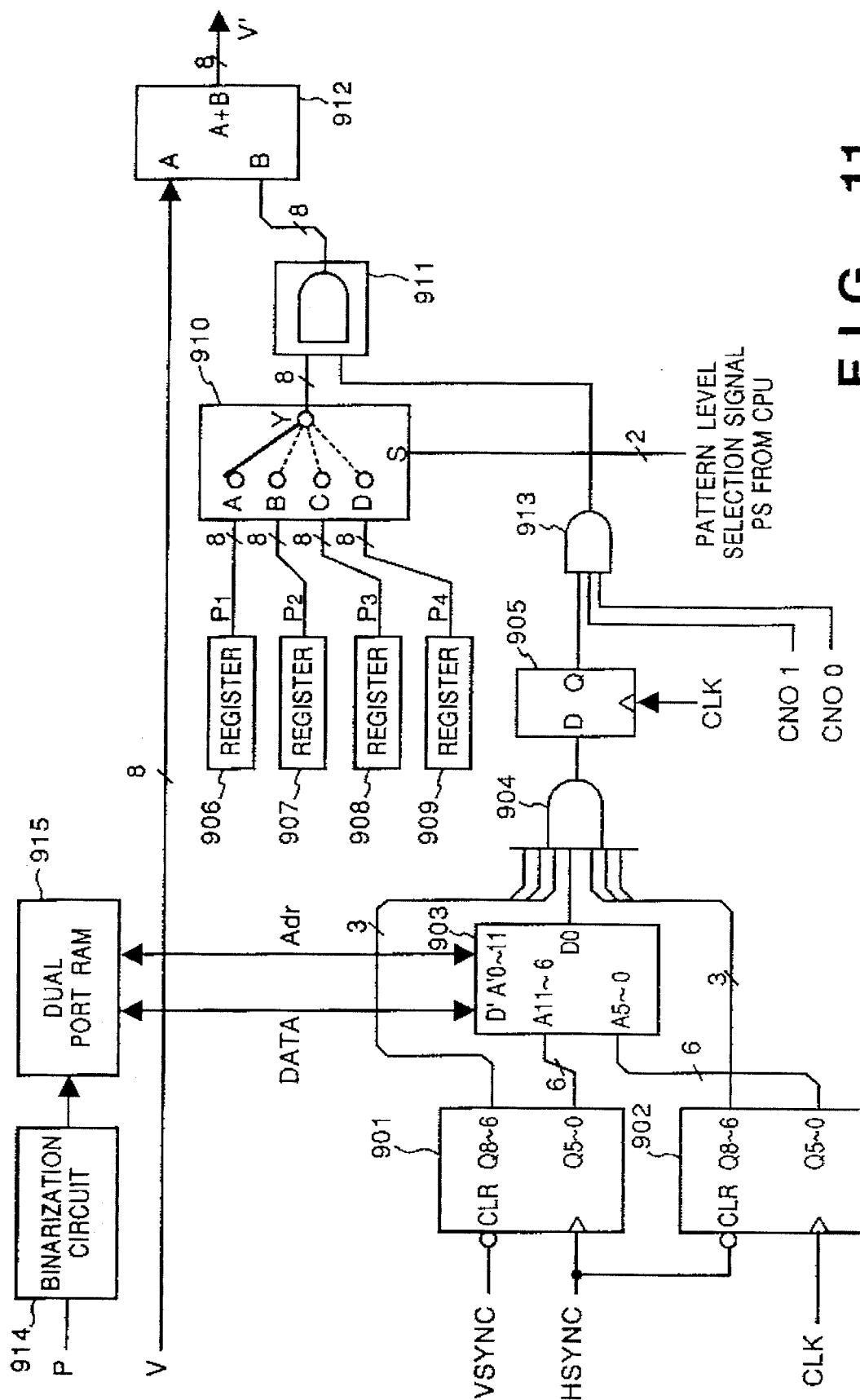
FIG. 11 is a block diagram of the construction of a pattern addition circuit 410 of the first embodiment.
Figure 14:
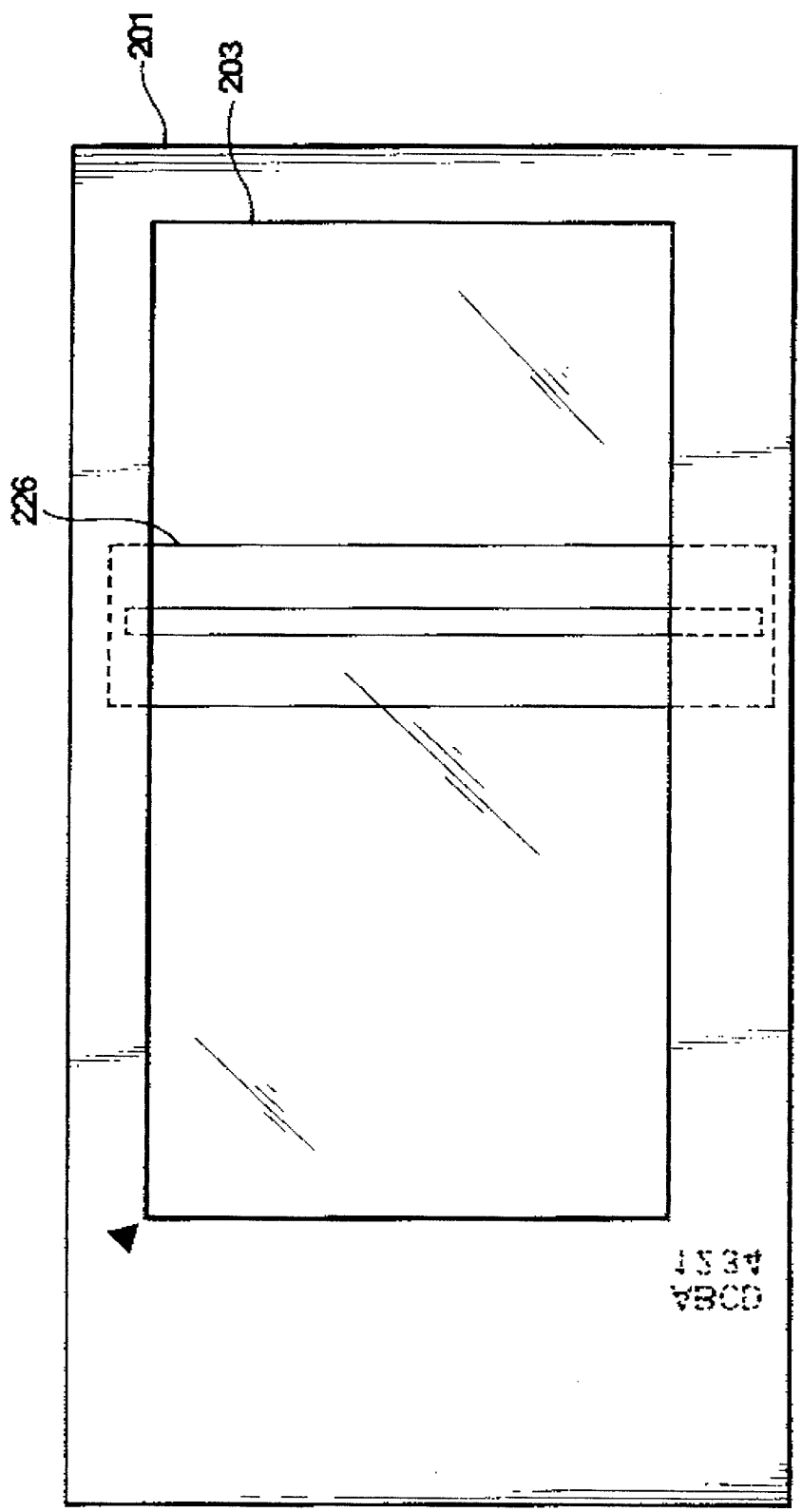
FIG. 14 is a top view of the original table in accordance with the first embodiment.

FIG. 11 is a block diagram of the construction of the pattern addition circuit 410 according to the first embodiment. FIG. 14 is a top view of the original table according to the first embodiment. In FIG. 11, numeral 901 represents a sub scanning counter, numeral 902 represents a main scanning counter, numeral 903 represents a look-up table RAM (hereinafter referred to as a "LUT"), numeral 905 represents a flip flop, numeral 913 represents an AND gate, numerals 906, 907, 908, and 909 represent registers, numeral 910 represents a 4 to 1 selector, numerals 911 and 913 represent AND gates, numeral 912 represents an adder, and numeral 914 represents a binarization circuit which binarizes an image signal P which has gone through a spatial filter. The binarization circuit 914 outputs "1" when a value of the image signal is greater than the predetermined threshold, while the circuit 914 outputs "0" when the value is smaller than the predetermined threshold. The binary data which is outputted from the circuit 914 is written in a dual port RAM 915. The image to be written in the dual port RAM 915 is an image which has been written in a particular place in the image scanner unit 201 such as 1201 in FIG. 14. The image is placed on a component in the reader which cannot easily be exchanged, i.e. at the outer side of the original glass table (platen) 203 (a frame part supporting the glass plate) and the under surface of the supporting frame within the area where the image sensors of the carriage 226 can read that image.

When an image is written in the dual port RAM 915, the signal CNO is set to "0" (magenta recording scanning). The apparatus is controlled so that the image signal P is a signal made from the green (G) signal of the CCD 210. This is because the green signal is the closest to the luminance signal of the image among the signals which can be easily produced.

The content stored in the dual port RAM 915 is read via a data bus Data and an address bus Adr by CPU 414. Since RAM 903 is also a dual port RAM (hereinafter referred to as a "RAM"), the CPU 414 writes into the RAM 903 the same data as the one read out from the RAM 915. The operations mentioned above are described below.

Figure 15:
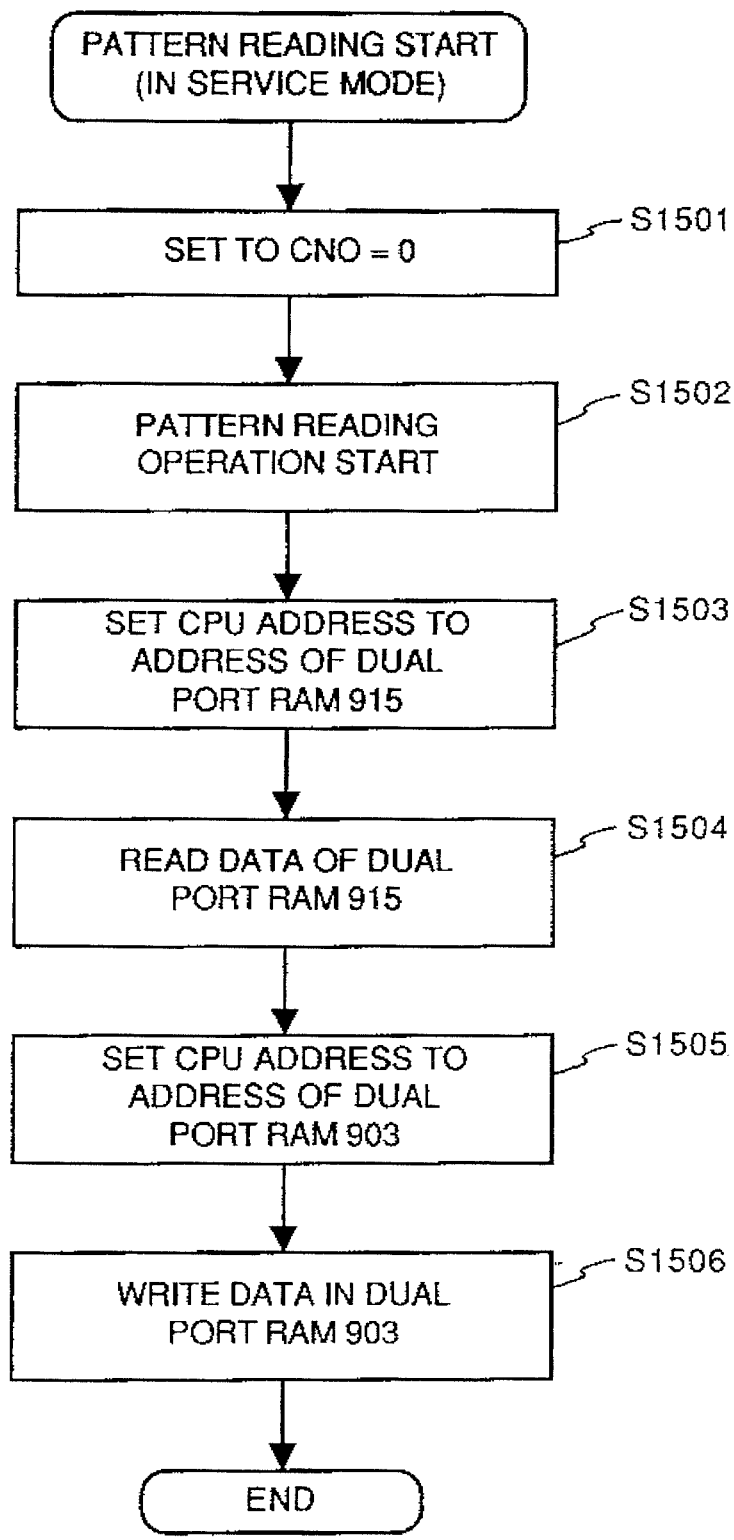
FIG. 15 is a flowchart illustrating a service mode in accordance with the first embodiment.

FIG. 15 is a flowchart illustrating a service mode according to the first embodiment in FIG. 15.

In the service mode, the CPU 414 sets the signal CNO to "0" (step S1501) and starts a pattern reading operation (step S1502). The CPU 414 sets a CPU address to the address of the dual port RAM 915 (step S1503) and reads the data of the dual port RAM 915 (step S1504).

The CPU 414 then sets the CPU address to the address of RAM 903 (step S1505) and writes the data read out from the dual port RAM 915 with respect to the RAM 903 (step S1506).

In this embodiment, it is arranged that a pattern to be added with respect to the specific original is read once at the mode only a copy maintenance engineer can have access to it when the copying machine is installed.

The sub-scanning counter 901 counts the main scanning synchronizing signal HSYNC while the main scanning counter 902 counts the pixel synchronizing signal CLK. Each counter repeatedly counts the signal in a cycle of a 9-bit width, that is, 512 cycles. As described above, the RAM 903 stores the patterns to be added and is supplied with lower 6 bits of each count value from the sub scanning counter 901 and the main scanning counter 902.

The AND gate 904 takes the logical product (AND) between the output of the RAM 903 and each bit of an upper 3-bit of the main scanning counter 901 and the sub-scanning counter 902. This logical product is synchronized with CLK by the flip flop 905. After the AND gate 913 takes the logical product between the 2-bit signals CNO "0" and "1", the result of the AND operation is outputted to the AND gate 911. This signal supplied to the AND gate 911 is effective only when CNO=2, that is, only when printing is being performed in yellow.

Values P1, P2, P3, and P4 are stored in advance in the registers 906, 907, 908, and 909. One of the values P1, P2, P3, and P4 is selected according to the pattern level selection signal PS designated by the CPU 414. The value is supplied through the AND gate 911 to the adder 912 where a pattern signal is added to an input signal V. The signal obtained by the adder 912 is outputted as a signal V'. Accordingly, when CNO=2, that is, printing in yellow is being performed, the pattern stored in the RAM 903 is repeatedly read out and added to the signal to be outputted.

In a pattern addition mode, a relationship P1<P2<P3<P4 is established in P1, P2, P3 and P4. In the selector 910, the following relation is set:

Y=A is set when s=00 (binary),
Y=B is set when s=01 (binary),
Y=C is set when s=10 (binary), and
Y=D is set when s=11 (binary).

Therefore, a pattern is added so that:

V'=V+P1 when PS=00 (binary),
V'=V+P2 when PS=01 (binary),
V'=V+P3 when PS=10 (binary), and
V'=V+P4 when PS=11 (binary).

The added pattern is formed with yellow toner alone so as to be difficult to discriminate with human eyes. This method is intended to utilize the fact that the discriminating ability of human eyes is weak with respect to a pattern formed only with yellow toner. Furthermore, it is arranged is such that the level of the pattern to be added can be variable according to the possibility of the existence of a specific original in the inputted original. It is thereby possible to make the pattern very difficult to discriminate in ordinary copies with human eyes. On the other hand, the pattern is added more distinctly if the possibility of the existence of a specific original is increased.

[Result of Duplication]

Figure 12:
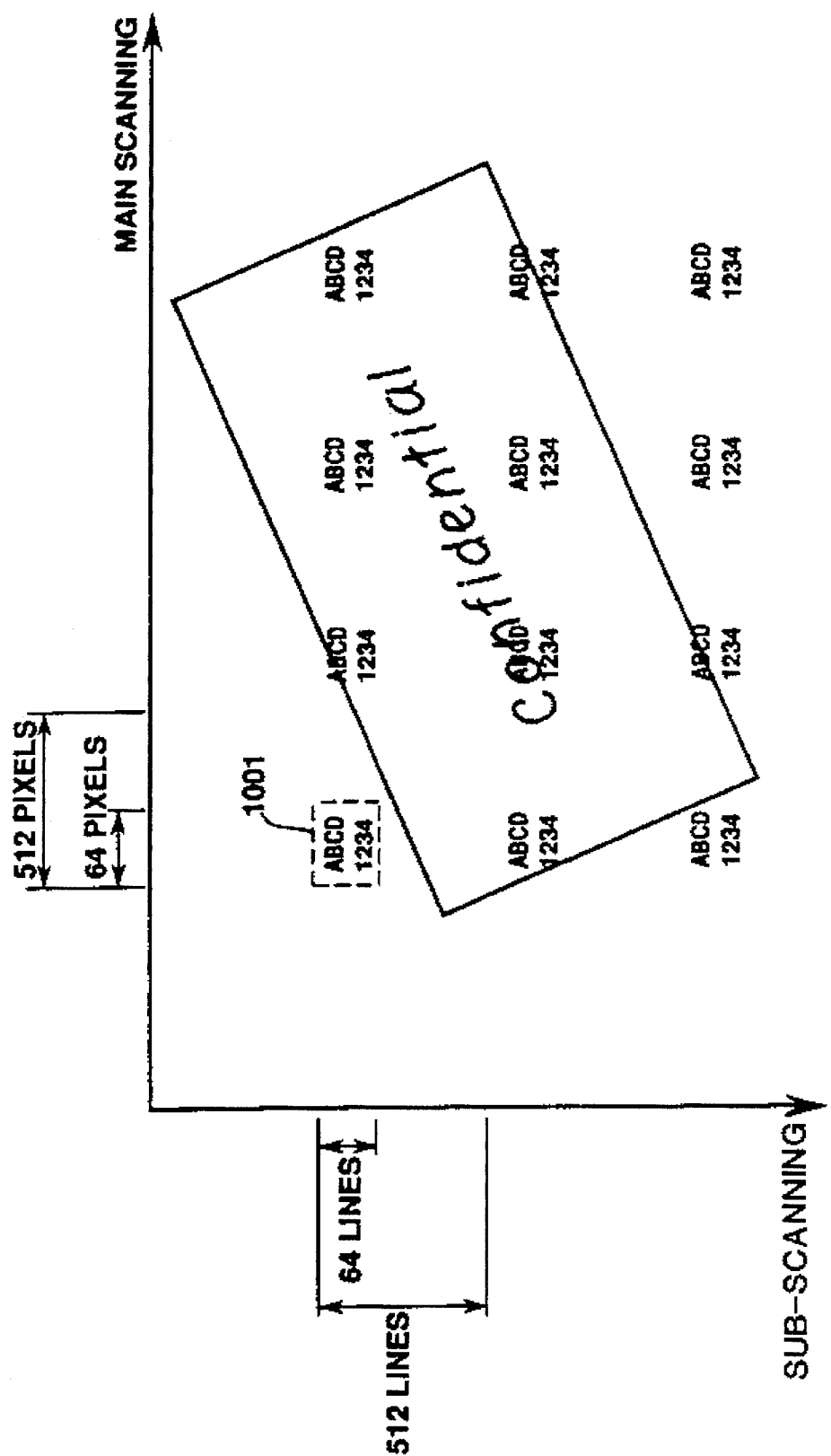
FIG. 12 is an example of the results of duplications in accordance with the first embodiment.

FIG. 12 is a diagram showing an example of the result of duplications according to the first embodiment. In FIG. 12, an added pattern is indicated by numeral 1001. The content stored in the ROM 903 is added. In the example shown in FIG. 12, the added pattern which is "ABCD" and "1234" in the two rows is formed in 64×64 pixels such as to be difficult to discriminate with human eyes. This patten is repeatedly formed at intervals of 512 pixels in the main scanning direction and at intervals of 512 lines in the sub-scanning direction. As this added pattern, a manufacturer's serial number exclusively assigned to the copying machine or encoded pattern of this number can be formed to identify the machine used for copying a specific original by examining the duplicates.

If the possibility that a specific original which should not be copied may exist in the read image is strong, a more distinguishable pattern can be added.

In the first embodiment, the pattern adding pitch is predetermined as 512 pixels in the main scanning direction, (or 512 line). The patterns are therefore added at intervals of approximately 32.5 mm since the copying machine according to the first embodiment has a resolution of 400 dpi (dots/inch). A bank note of the Bank of Japan has a width of approximately 76 mm in the direction along its short side. The short side of the paper currencies of major countries in the world ranges from approximately 60 mm to 120 mm. The pattern can therefore be always added on the duplicate of any bank note. Even if a part of a bank note duplicate is cut out and abused, the information on the model number of used copying machine can be specified by examining the duplicate and reading the added pattern.

[Flowchart]

Figure 13:
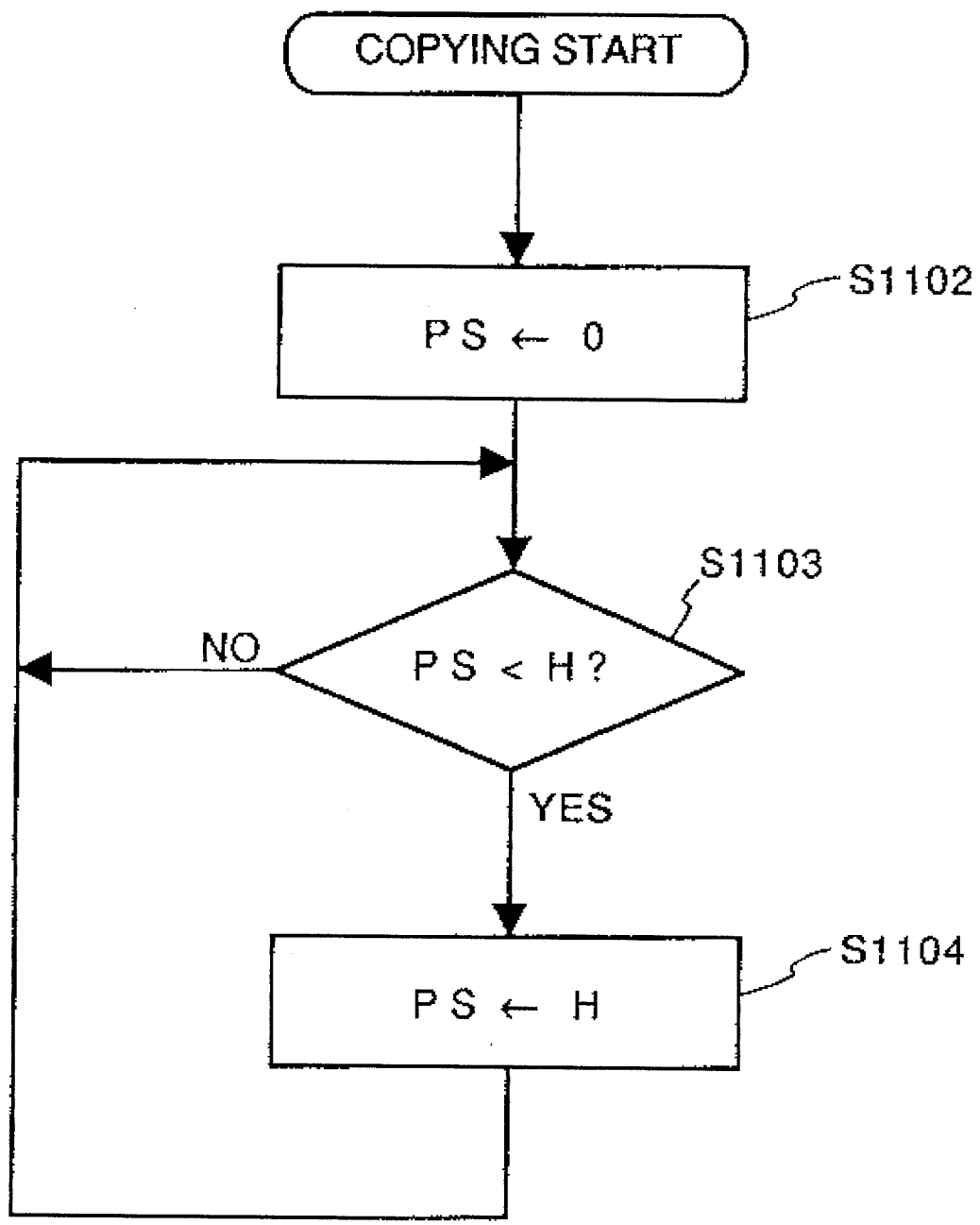
FIG. 13 is a flowchart illustrating a procedure of setting a pattern level selection signal PS in accordance with a CPU 414 of the first embodiment.

FIG. 13 is a flowchart of the procedure of setting the pattern level selection signal PS according to the first embodiment. Processing is controlled by the CPU 414.

Immediately after the start of copying, at step S1102, "0" is set in the pattern level selection signal PS. At Step S1103, the present determination level H and the value of PS are compared. If the level H is higher, the value of H is set in PS at step S1104. If the level H is not higher, the process returns to step S1103. That is, the maximum value among the values from the copying start to the present time is set according to the recording history of the discrimination signal H.

As described above, in the first embodiment, a particular pattern which is difficult to discriminate with human eyes is added in accordance with the method of identifying a copying machine, so that the pattern can be used as a key to identifying the copying machine in a case where a specific original (e.g. bank notes) which should not be copied is duplicated. The particular pattern is repeatedly added at a pitch shorter than the width of a bank note in the direction along the short side thereof, so that the added particular pattern can always be included even in a part of a copy of the bank note which is cut out to be abused. It is possible to ascertain the copying machine used or the person who has operated the copying machine or to narrow down suspected machines or persons by examining the added pattern.

<The Second Embodiment>

In the first embodiment, the added patterns indicating characters or numbers are utilized, however, in the second embodiment, a bar code is utilized as an added pattern in order to foil counterfeiters. The whole construction is similar to that of the first embodiment. However, the characteristic of the second embodiment is the pattern addition circuit in particular. Accordingly, the description for the functions which are common both in the first and second embodiment is omitted here and the pattern addition circuit is mainly described.

(Pattern Addition Circuit)

Figure 17:
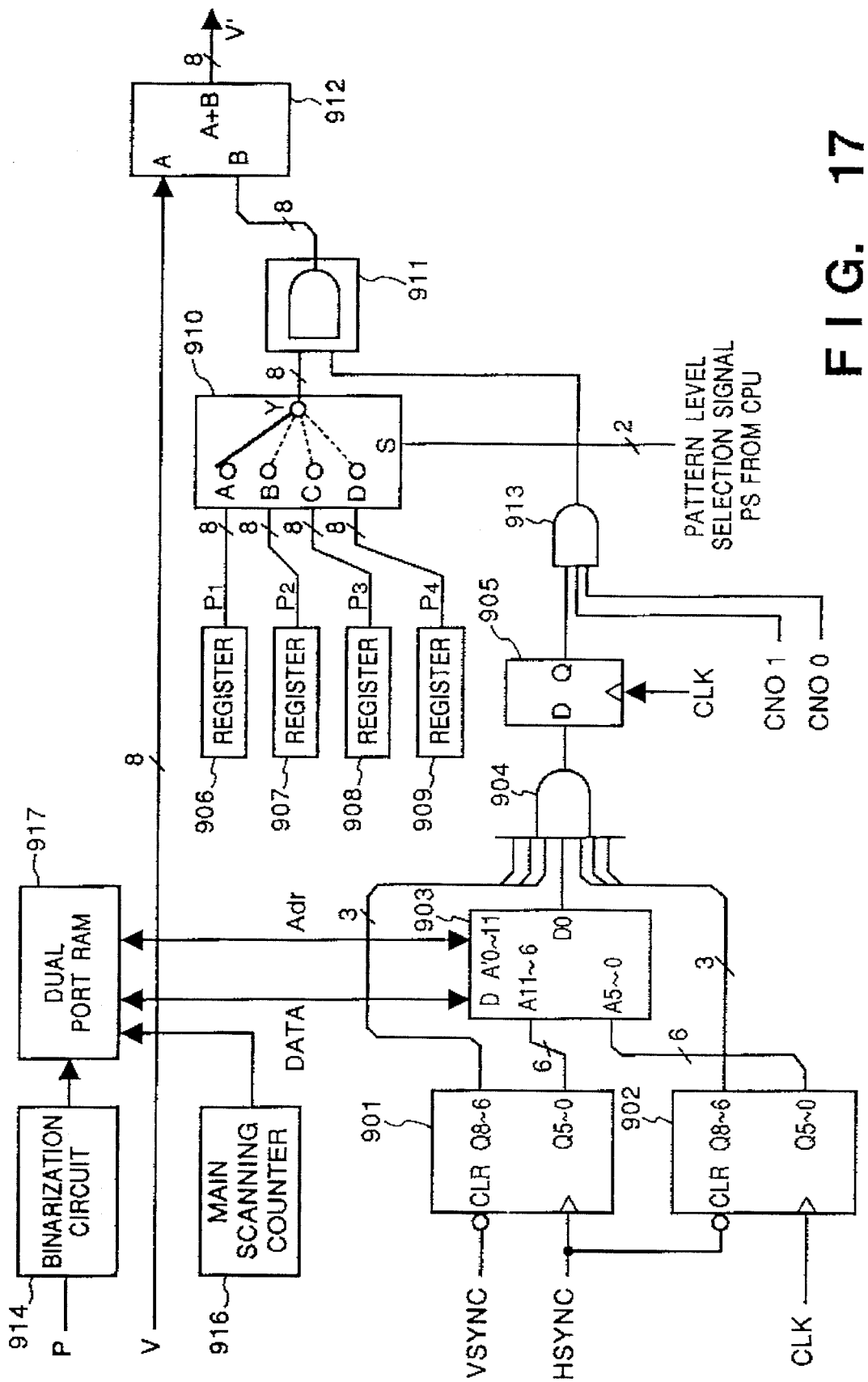
FIG. 17 is a block diagram of the construction of a pattern addition circuit of the second embodiment.
Figure 19:
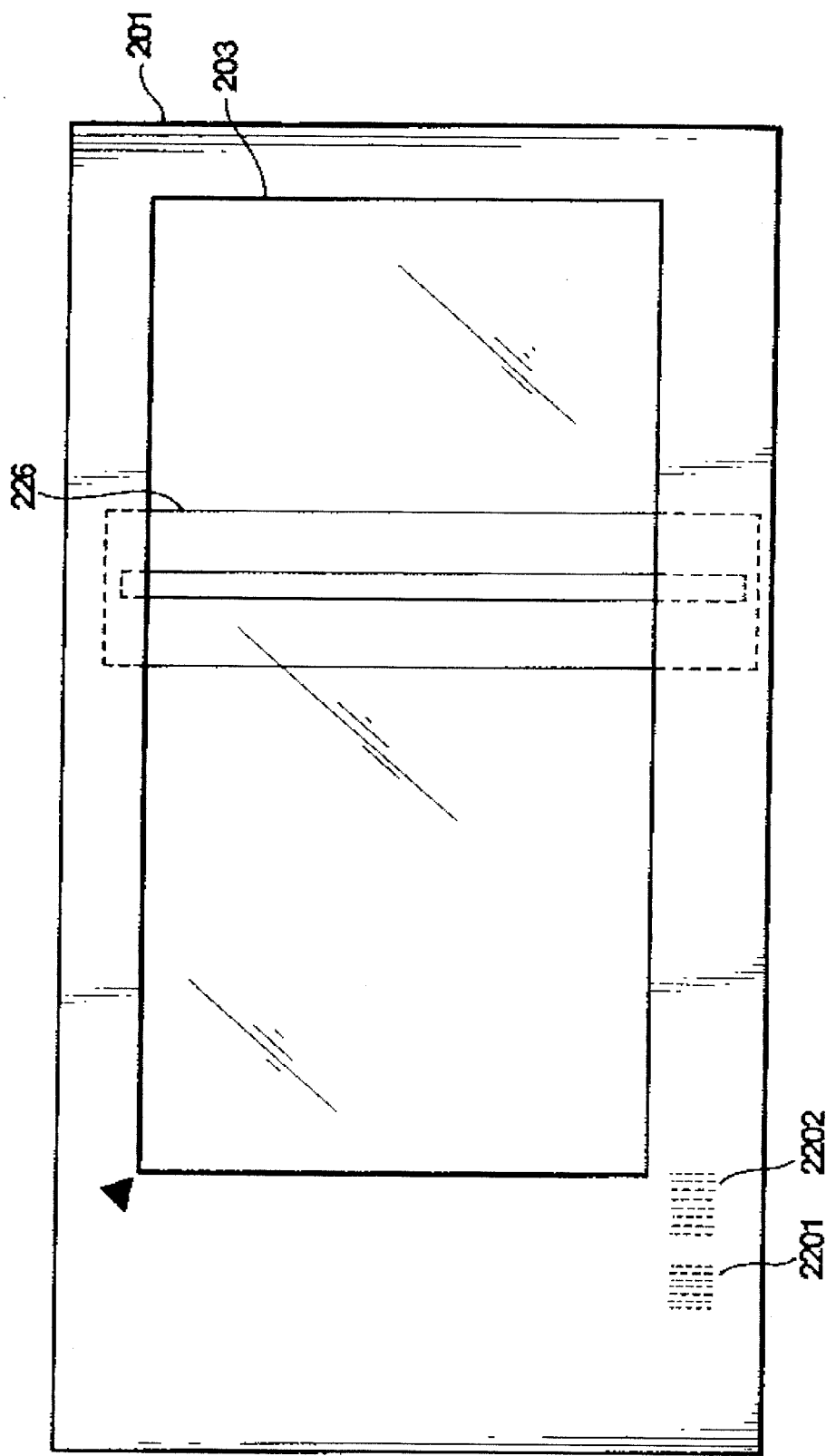
FIG. 19 is a diagram illustrating a pattern reading position in accordance with the second embodiment.

FIG. 17 is a block diagram illustrating the construction of the pattern addition circuit according to the second embodiment. FIG. 19 is a diagram illustrating a reading position of a adding pattern according to the second embodiment.

This embodiment (FIG. 17) differs from that of the first embodiment (FIG. 11) in that the count value in the main scanning direction is inputted to the dual port RAM 917. The count values are generated by the main scanning counter 916. The main scanning counter 916 is a counter which picks up only the pixel data of a particular main scanning address. The dual port RAM 917 writes the data received from the binarization circuit 914 only when the particular main scanning address is counted. The above-mentioned particular main scanning address is a position for the bar codes 2201, 2202 which are stored in a particular part in the image scanner 201. The component which is storing the bar codes is a component of the image scanner 201 which cannot easily be exchanged, that is, the outer side of the original glass table 203 (the frame part supporting a glass plate) and the under surface of the supporting frame within the area where the image sensor of the carriage 226 can read that image.

(Results of Duplication)

Figure 18:
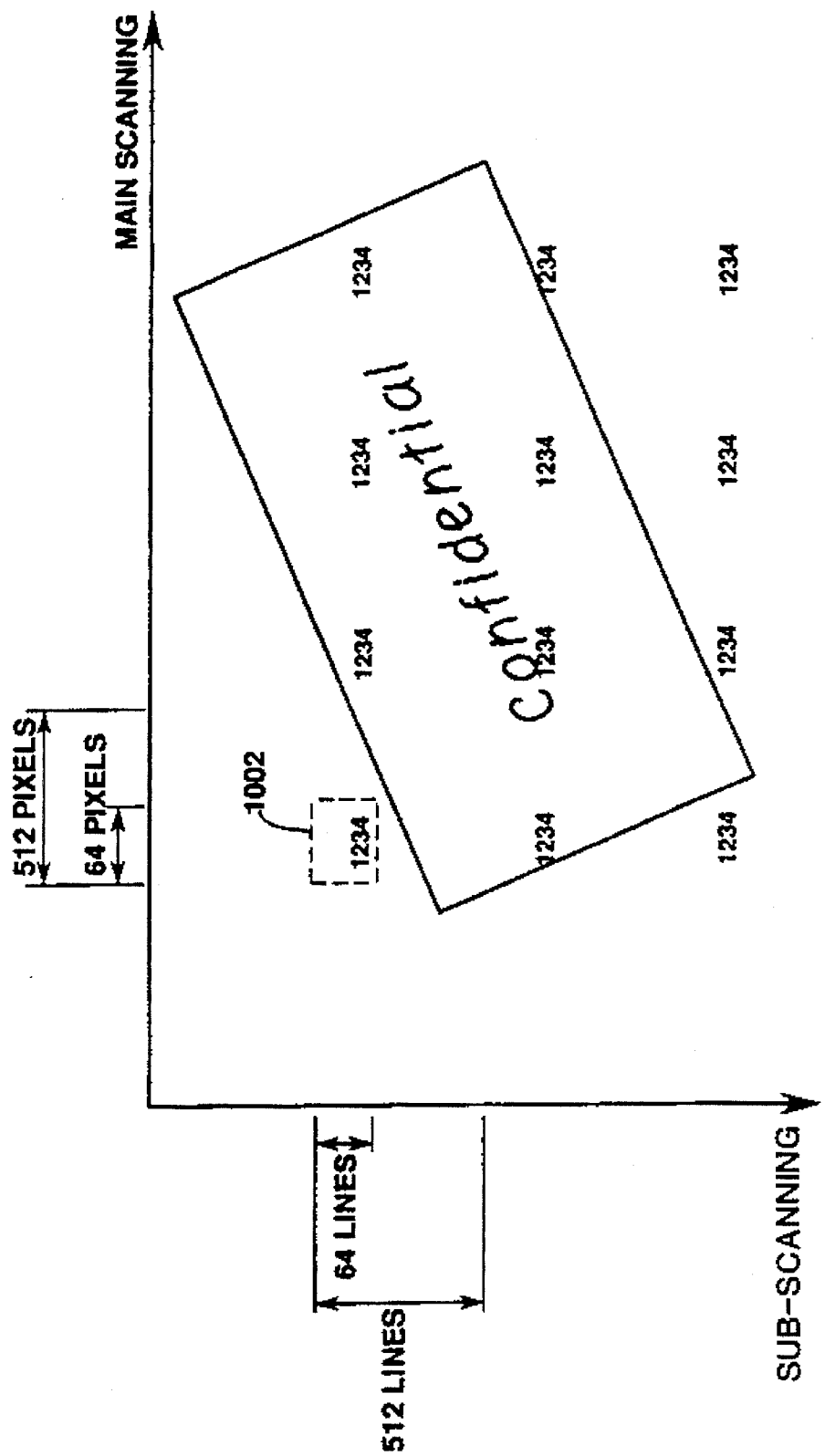
FIG. 18 is an example of the results of duplications in accordance with the second embodiment.

FIG. 18 is a diagram illustrating an example of the results of duplications according to the second embodiment.

In the second embodiment, the code of the bar code 2201 is encoded by an encoding function and the encoded code is further converted to the bar code 2202.

The bar code 2201 is the result when the manufacture's serial number of the image scanner 201 is coded. As an instance shown in FIG. 18, the bar code, the pattern "1234", is added in 64×64 pixels so that it is difficult to distinct with human eyes. The patterns are repeatedly placed at the intervals of 512 pixels in the main scanning direction and 512 lines in the sub scanning direction. Since the content of the dual port RAM 917 according to the second embodiment represents the density changes of the pixels in the sub-scanning direction of the scanning system, the bar code can be easily decoded by reading the content through the data bus Data and address bus Adr.

Similarly, the code "1234" is written in the RAM 903 as image data. The code "1234" is a code that the bar code 2201 is decoded by the data bus Data and address bus Adr. Since this operation is similar to that of the above-described service mode in FIG. 15 without having a step of decoding a pattern on the basis of image data read-out from RAM 917, the description for the operation is omitted.

The pattern forgery detection method is now described.

As a pattern forgery detection method, $\log_e(x)$ is used as an encoding function and $\exp(x)$ is used as a decoding function. Take an example of the case where the code content of the bar code 2201 is "1234". When X=1234, $\log_e(1234)=7.118$. The bar code 2202 is obtained when 7.118 is converted to a bar code. In the contrast with this, when the bar code 2202 is read, $\exp(7.118)=1234$.

Accordingly, a mutual relation is examined and if it is not correct, it is determined that the bar code is forged. The copy operation is then suspended, and the display 2702 of the operation section 2701 of the main apparatus indicates to call a copy maintenance engineer (FIG. 27). The capability for preventing counterfeits is thus improved. The above-described pattern forgery detecting processing can be programmed as a pattern forgery detection mode, so that the determination is performed before the original is read when the copying start key is pressed by a user.

It should be noted that only the difference between the second embodiment and the first embodiment is described above and other functions in the second embodiment are the same as those of the first embodiment.

Accordingly, in addition to the effects of the first embodiment, the second embodiment makes it possible to prevent the printing of a specific image by detecting an existence of the pattern forgery.

<Third Embodiment>

In the second embodiment, the content in which the bar code is decoded is added to an output image. However, this does not impose a limitation upon the present invention, for it can be arranged that the image of the bar code can be added to the output image as an added pattern.

In the third embodiment, the method for adding a pattern is improved in the same construction as that of the second embodiment.

Figure 20:
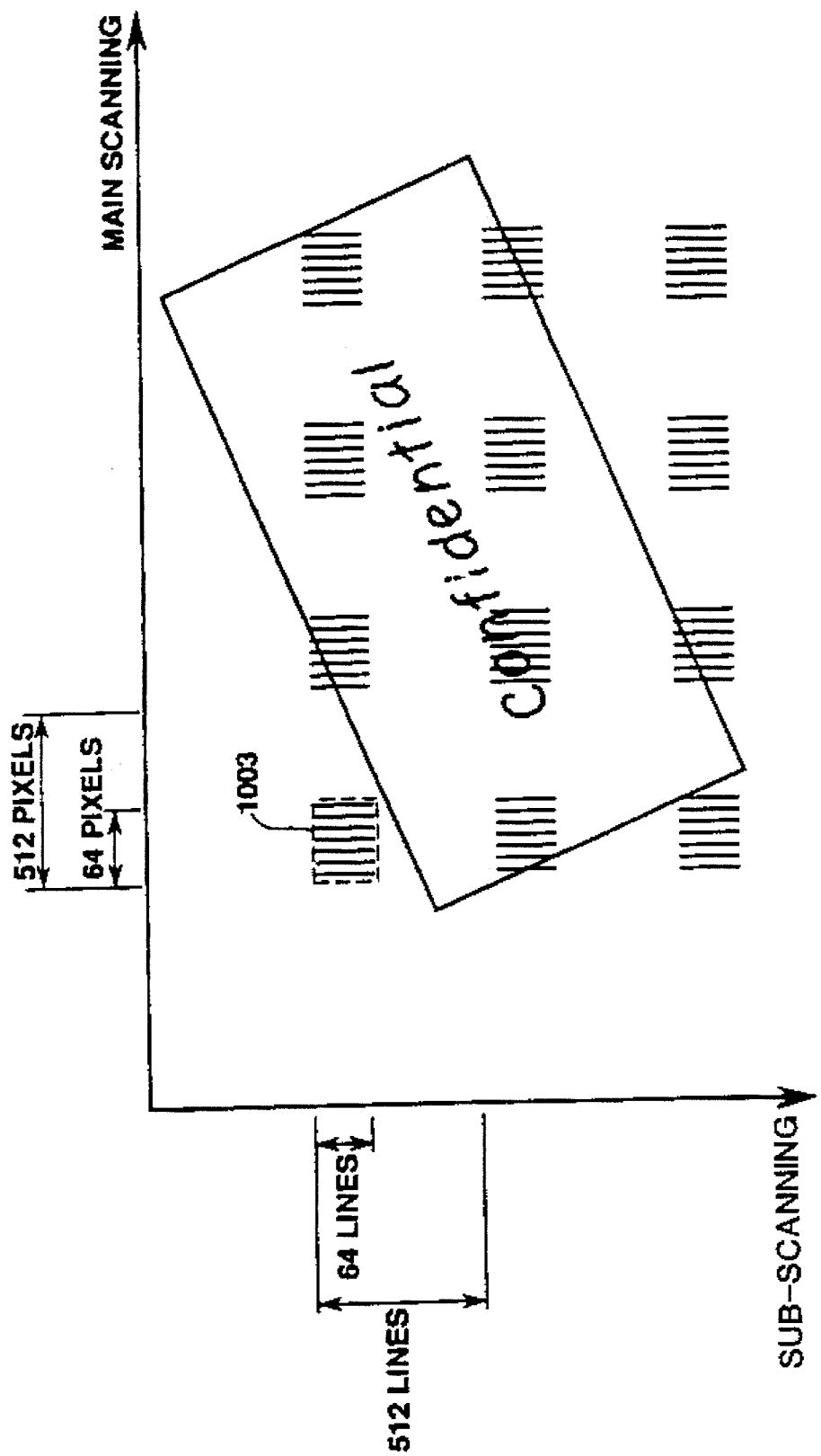
FIG. 20 is an example of the results of duplications in accordance with the third embodiment.

FIG. 20 is a diagram illustrating an example of the result of duplication according to the third embodiment. In FIG. 20, numeral 1003 denotes a bar code pattern indicating either the bar code 2201 or 2202 in FIG. 19 as it is. The method for adding this bar code pattern 1003 is similar to that of the first embodiment.

Accordingly, on the output image to which the bar code pattern is added, the information, namely a manufacture's apparatus serial number, can be identified in a manner such that the output image is read and the added bar code is decoded. In the third embodiment, thus, the function as a bar code pattern decoding mode can be obtained.

<The Fourth Embodiment>

In the second embodiment, for the pattern forgery detecting mode, the two bar codes 2201 and 2202 are added to the image scanner unit, however, the present invention is not limited to this embodiment. It can be arranged so that only the bar code in which the encoded code content is converted to a bar code is added to the image scanner unit. Since the overall construction of the fourth embodiment is similar to that of the second embodiment, the detail description is omitted here and the only characteristic part in the fourth embodiment is described.

Figure 21:
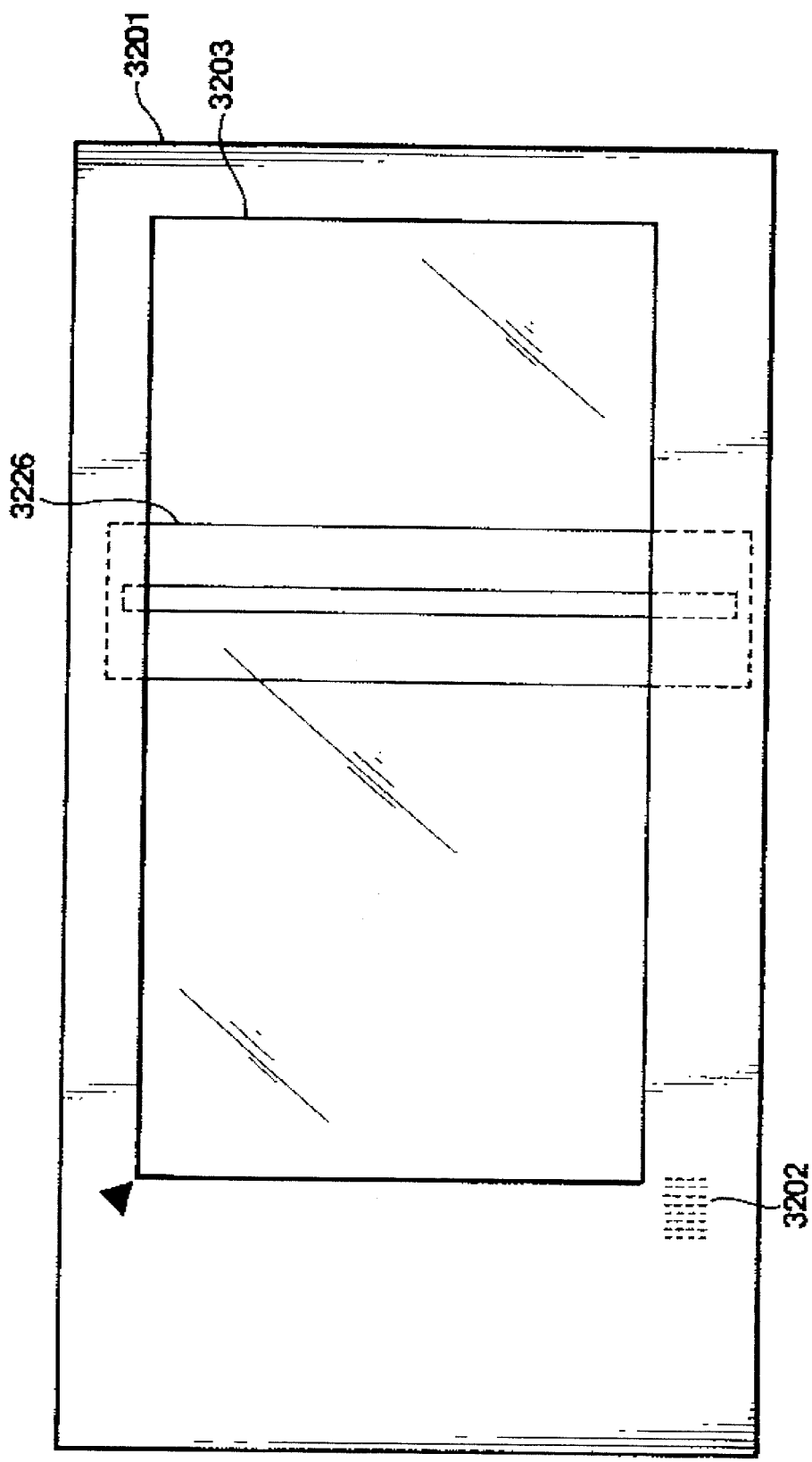
FIG. 21 is a diagram illustrating a pattern reading position in accordance with the fourth embodiment.

FIG. 21 is a diagram illustrating a reading pattern position of the added pattern according to the fourth embodiment.

As similar to the second embodiment, the particular main scanning address is a position for the bar codes 3202 which is stored in a particular part in the image scanner 3201. The component which stores the bar codes is a component of the image scanner 3201 which cannot easily be exchanged, that is, as shown in FIG. 21, the outer side of the original glass table 3203 (the frame part supporting a glass plate) and the under surface of the supporting frame within the area where the image sensors of the carriage 3226 can read that image.

In the fourth embodiment, the code content "1234" which is a code content before the decoding, taken an example in the second embodiment, is stored in the backup RAM in the control circuit and inputted from the operation section at a shipment from the factory. If the mutual relation between the code content stored in the backup RAM and the content of the decoded bar code 2202 is not correct, it is determined that the bar code 2202 is forged or the content of the backup RAM is rewritten. From this judgment, the main apparatus suspends the copying operation and the operation section displays the indication to call a copy maintenance engineer.

In this way, the same effect as that of the second embodiment can be obtained.

<The Fifth Embodiment>

In each embodiment, the manufacturer's serial number of a copying machine or an encoded pattern of this number is used as a particular pattern to be added. However, any other pattern can be added as long as it has information which serves for identification of the copying machine.

For example, the information can be such as the machine manufacturing date, the machine lot number, and/or a machine version name for identifying the machine.

<The Sixth Embodiment>

In each embodiment, the image which is written in the particular place where the image scanner can read that image is read as a pattern to be added. It can be arranged that the original of the code indicating the user, the code capable of identifying the user, is placed on the original glass table and read it in advance at the machine installation.

<The Seventh Embodiment>

Figure 22:
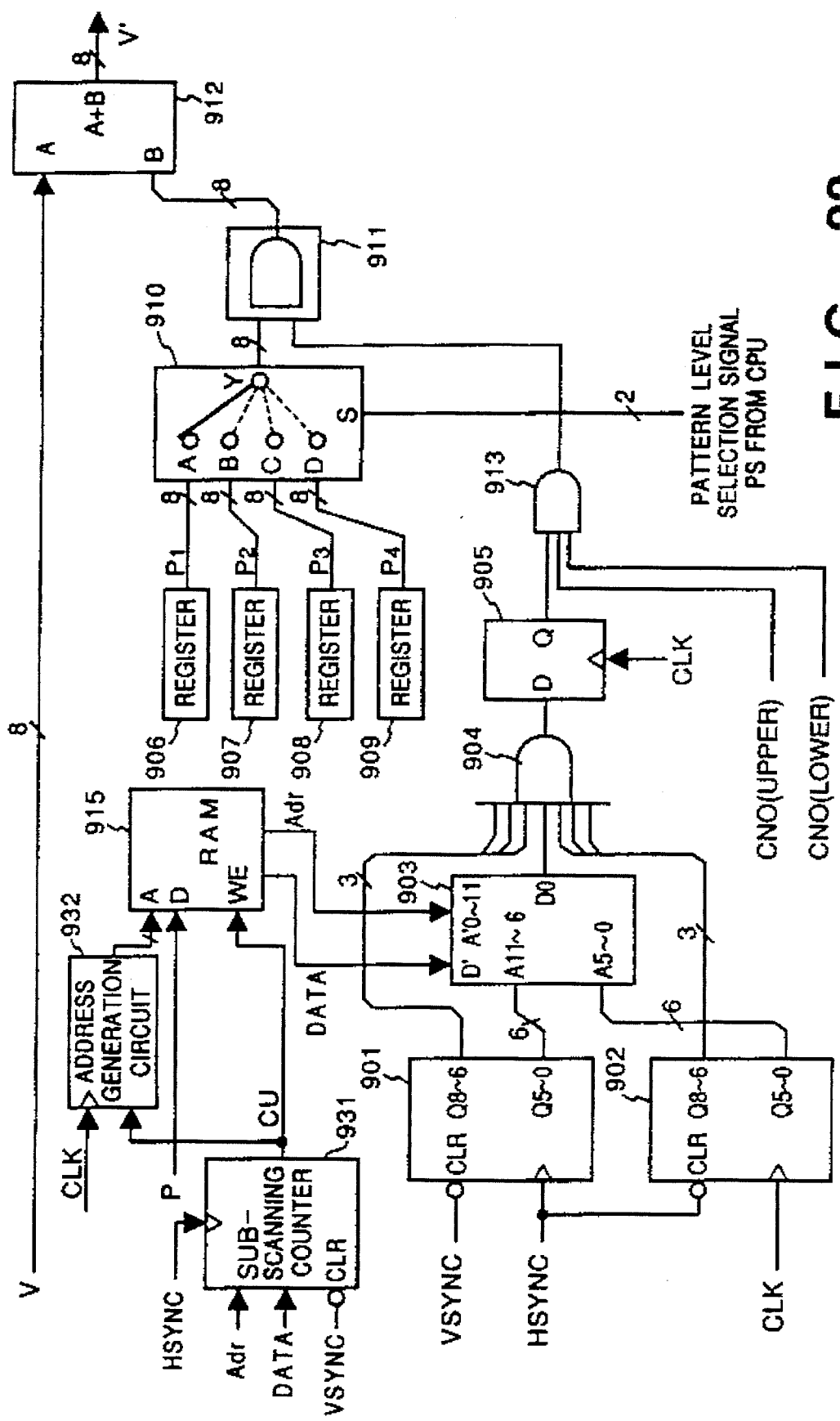
FIG. 22 is a block diagram of the construction of a pattern addition circuit 410 of the seventh embodiment.

FIG. 22 illustrates a block diagram of the pattern addition circuit 410 according to the seventh embodiment. Numeral 901 is a sub-scanning counter, numeral 902 is a main scanning counter, numeral 903 is a look-up table RAM, numeral 905 is a flip flop, numeral 913 is an AND gate, numerals 906, 907, 908, 909 are registers, numeral 910 is a 4 to 1 selector, numerals 911, 913 are AND gates, and numeral 912 is an adder.

The data of the image signal P which has gone through the spatial filter is written in the dual port RAM 915.

For the data to be written in the RAM 915, only the pixel data of the specific sub-scanning address is needed. Therefore, the sub-scanning counter 931 counts that specific address and the data for one scanning line is written in RAM 915 at the pertinent address. This is because the image information for writing in RAM 915 is a bar code which is written at the particular place of the reader in the main scanning direction as shown 4201 in FIG. 23.

The sub-scanning counter 931 counts the main scanning synchronizing signal HSYNC and outputs a signal CU when the value of the resister set in the CPU becomes equal to the count value. The address generation circuit 932 which received the signal CU generates an address value for one line and supplies to the RAM 915. The signal CU is inputted to the light enable signal of the RAM 915 and the image data at the particular sub scanning position set by the CPU can be written in the RAM 915.

When an image is written in the RAM 915, the signal CNO is set to as "0" (scanning for magenta). That is, the image signal P is a signal (the density signal of magenta) made from the green (G) signal of the CCD 210. This is because the green signal is the closest to the luminance signal of the image among the signals which can be easily produced.

Figure 23:
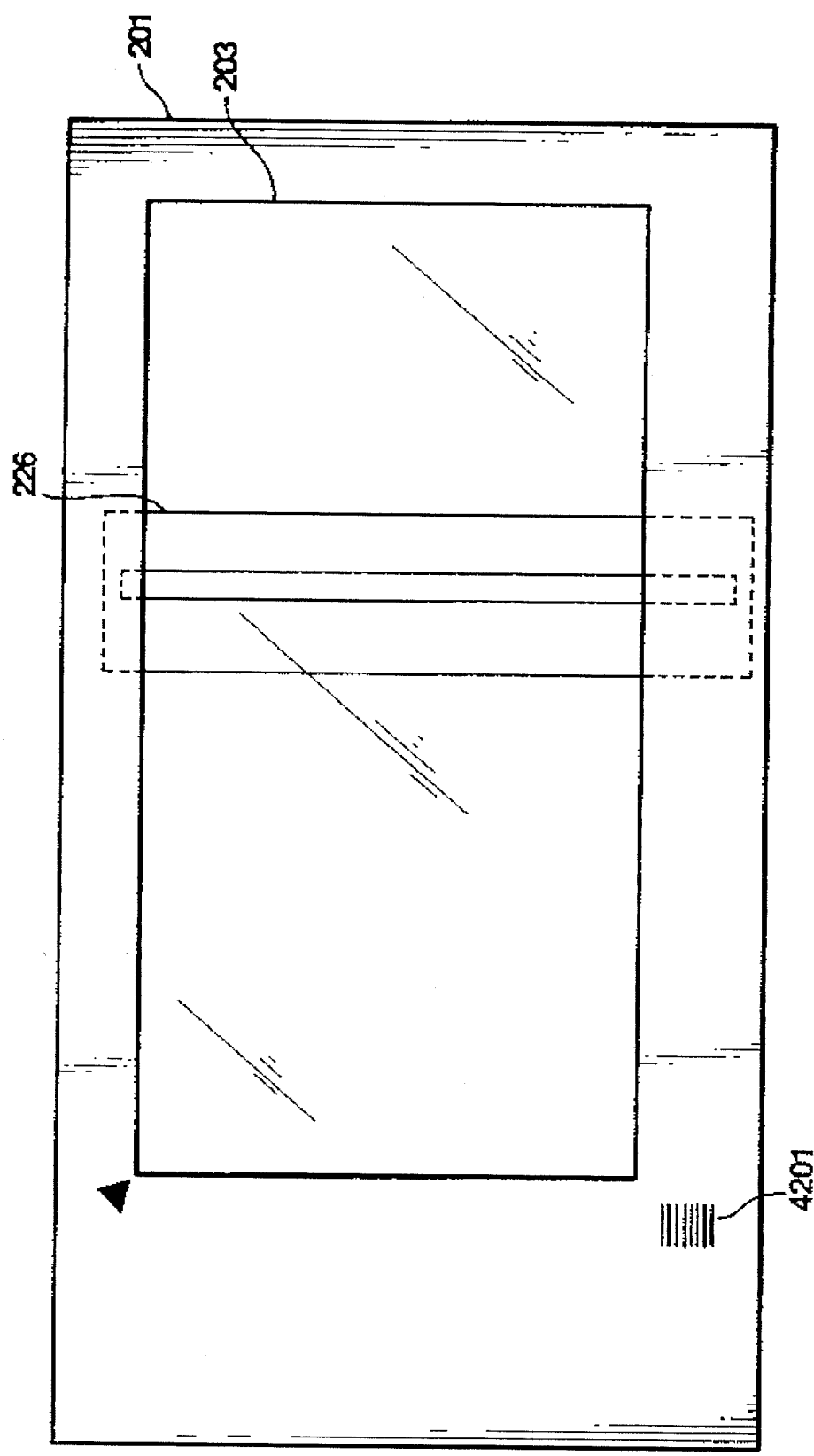
FIG. 23 is a top view of the original table in accordance with the seventh embodiment.

The bar code 4201 is the coded manufacture's serial number of the reader and represents "1234" in FIG. 23. Since the content of the dual port RAM 915 represents the density change of the pixels in the main scanning direction of the scanning system, the bar code can be easily decoded by reading the content from the CPU through the data bus Data and address bus Adr.

In this case, reading accuracy can be improved by reading the content at a different scanning position for a plurality of times. To do so, it can be arranged that the count value of the register of the sub-scanning counter 931 is reset by the CPU and the same operation is performed. If the content is read three times and the results are "1234", "1234", and 37 1244", it is determined that the correct result is "1234".

A bar code comprises vertical black bars and rectangular white areas between two bars (hereinafter referred to as "white bars". These bars have two kinds of width in short side: approximately 0.5 mm and 1 mm. When these bars are read at 400 dpi, the number of pixels for 0.5 mm is approximately 8 pixels and the number of pixels for 1 mm is approximately 16 pixels. The difference of these widths can be easily distinct.

Figure 25:
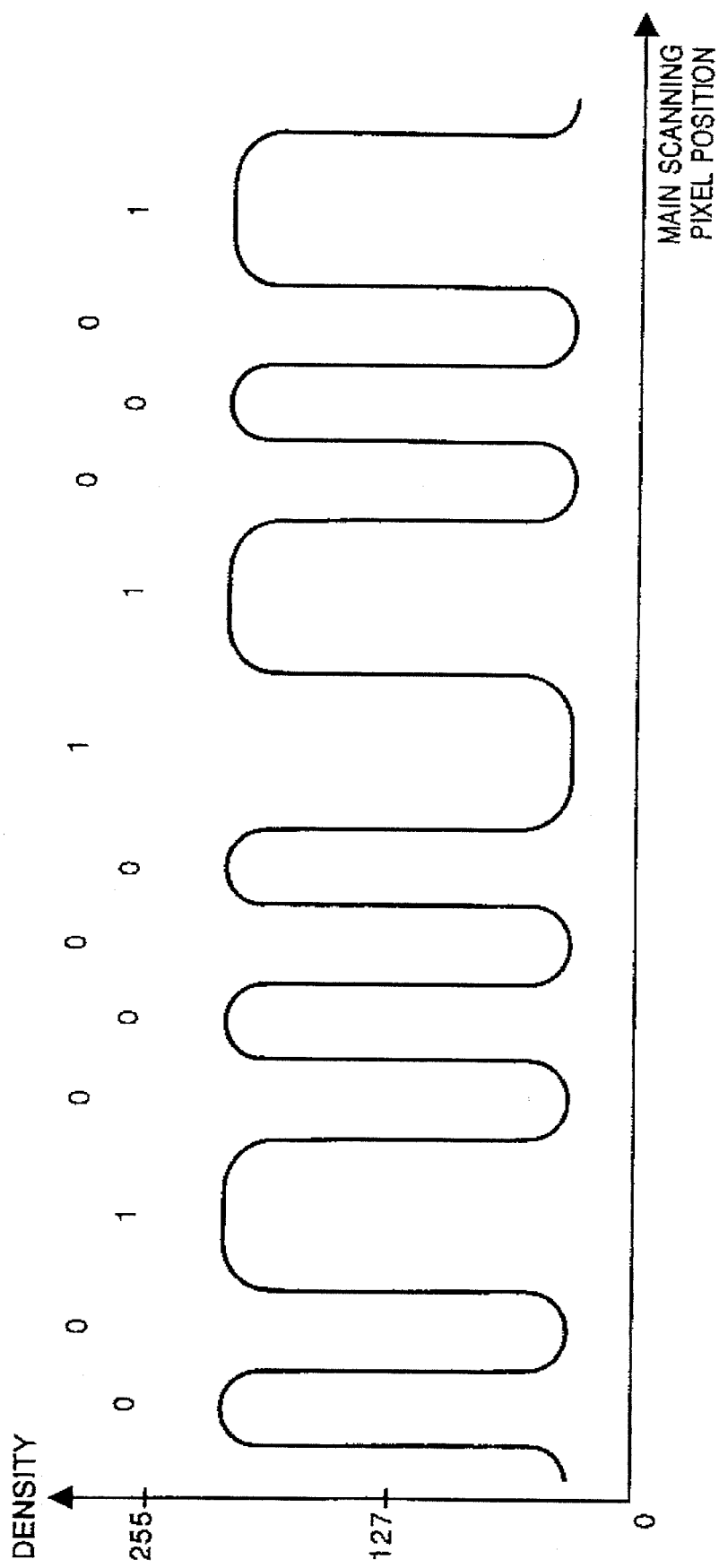
FIG. 25 is a diagram illustrating the bar code reading data of the seventh embodiment.

FIG. 25 illustrates the image data at which the bar code is read, that is, the image data written in the RAM 915. As the the density is higher, the area is darker and the data is closer to the value 255, while as density is lower, the area is whiter and the data is closer to the value 0.

It is determined that the area at which the density is higher than 127 is black, a black bar, while the area at which the density is lower than 126 is white, a blank bar. If the width of a bar is less than 12 pixels, it is a bar having the width of 0.5 mm (a narrow bar), while the width is over 12 pixels, it is a bar having the width of 1 mm (a wide bar).

Figure 26:
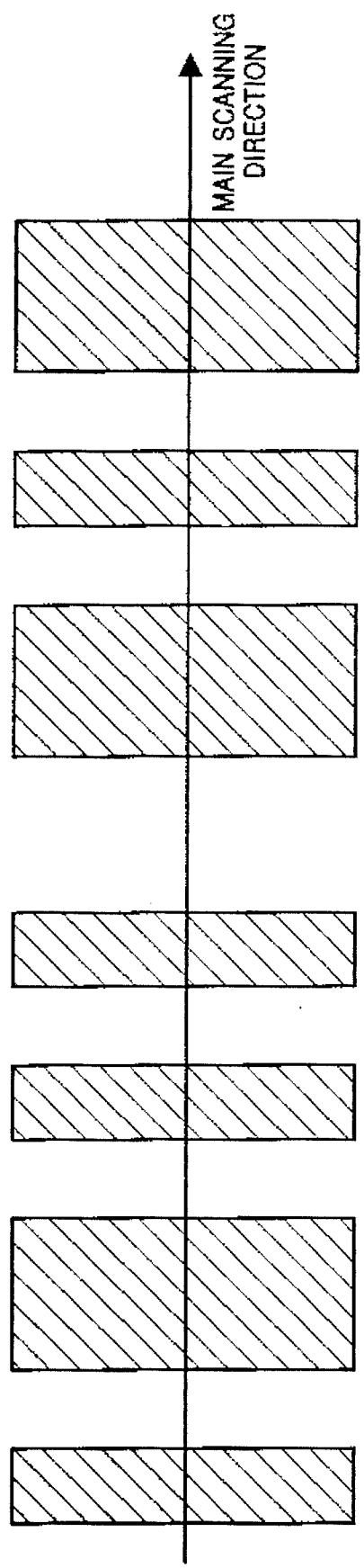
FIG. 26 is the bar code of the seventh embodiment.

FIG. 25 is the data when the bar code of FIG. 26 is read according to the above-described criteria. As shown in FIG. 25, the black bar is read as 0100101 and the white bar is as 000100. However, it is assumed that the narrow bar is "0" and the wide bar is "1". The first "0" of the black bar is a start bit. Each three bits of the black bars is read after that, 100 corresponds to "2" and 101 corresponds to "4". Similarly, when the white bars are read, 000 is "1", 100 is "3" and it turns out to be "1234" as a whole. FIG. 13 is a flowchart illustrating this operation. The pattern reading is operated when the main switch is turned on.

Figure 24:
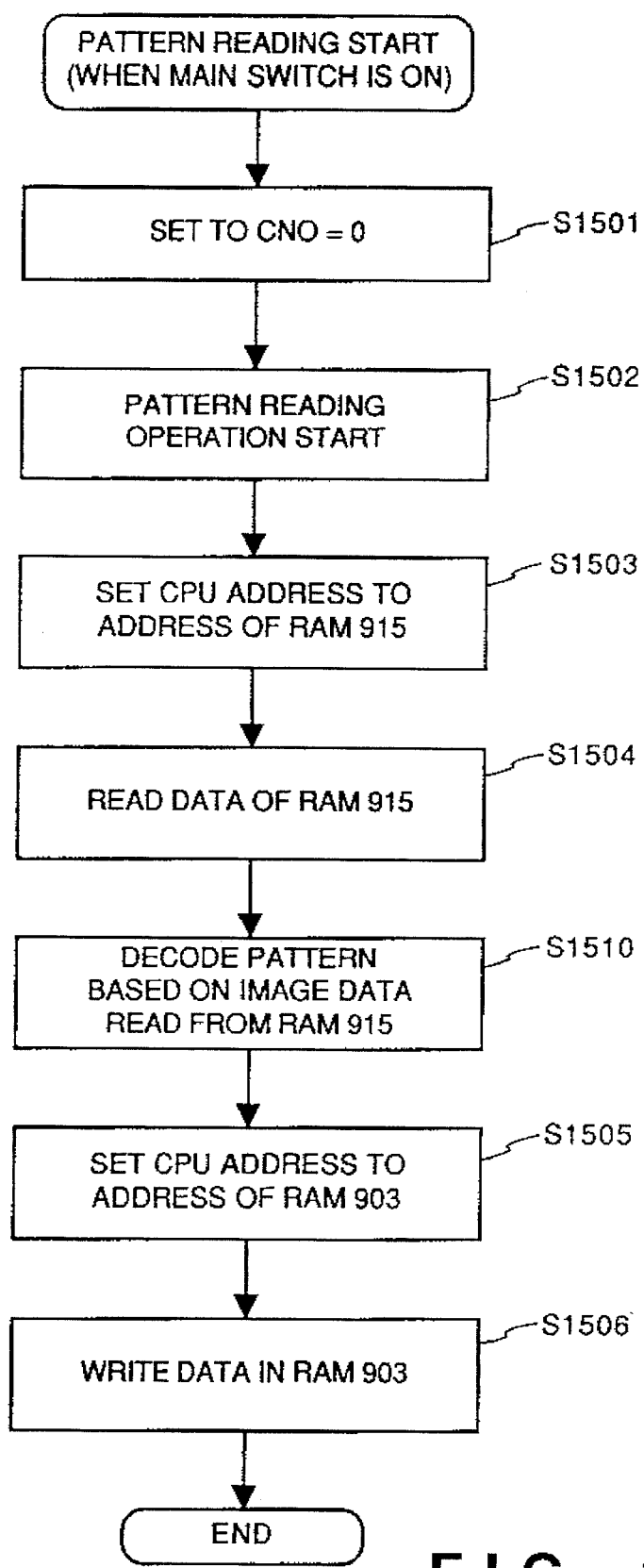
FIG. 24 is a flowchart illustrating a pattern reading operation in accordance with the seventh embodiment.

Since RAM 903 is a dual port RAM (hereinafter referred to as a "RAM"), the code "1234" is written in the RAM 903 as image data. The code "1234" is a code that the bar code 1201 is decoded by the data bus Data and address bus Adr. FIG. 24 is a flowchart illustrating this operation. The pattern is read when the main switch is turned on.

The sub-scanning counter 901 counts the main scanning synchronizing signal HSYNC while the main scanning counter 902 counts the pixel synchronizing signal CLK. Each counter repeatedly counts the signal in a cycle of a 9-bit width, that is, 512 cycles. As described above, the RAM 903 stores the patterns to be added and is supplied with lower 6 bits of each count value from the sub-canning counter 901 and the main scanning counter 902.

The AND gate 904 takes the logical product (AND) between the output of the RAM 903 and each bit of an upper 3-bit of the main scanning counter 901 and the sub scanning counter 902. This logical product is synchronized with CLK by the flip flop 905. After the AND gate 913 takes the logical product between the 2-bit frame-sequential signals CNO "0" and "1", the result of the AND operation is outputted to the AND gate 911. This signal supplied to the AND gate 911 is effective only when CNO=2, that is, only when printing is being performed in yellow.

Values P1, P2, P3, and P4 are stored in advance in the registers 906, 907, 908, and 909. One of the values P1, P2, P3, and P4 is selected according to the pattern level selection signal PS designated by the CPU 414. The value is supplied through the AND gate 911 to the adder 912 where a pattern signal is added to an input signal V. The signal obtained by the adder 912 is outputted as a signal V'. Accordingly, when CNO=2, that is, printing in yellow is being performed, the pattern stored in the RAM 903 is repeatedly read out and added to the signal to be outputted.

FIG. 24 is a flowchart illustrating the pattern reading operation in the seventh embodiment.

This embodiment differs from the embodiment of FIG. 15 in that the above-described operation is performed not at the service mode, but whenever the main scanning switch is turned on and there is the step S1510 where the pattern is decoded based on the image data read from the RAM 915.

<The Eighth Embodiment>

In the above-described seventh embodiment, the narrow bar and wide bar in a bar code are discriminated by a single threshold (12 pixels). However, it can be arranged that, in the case where there is a bar in which the width is out of the predetermined range, it is determined that there is a strong possibility that the bar code is forged. Accordingly, the whole operation of the apparatus is suspended and the operation section can display the indication to call a copy maintenance engineer.

More particularly, it is predetermined that the width of a narrow bar is in the range of 5 to 11 pixels and that of a wide bar is in the range of 13 to 19 pixels. If there is a bar in which the width is out of the predetermined ranges, it is determined that there is a strong possibility that the bar code has been forged and the whole operation of the apparatus is suspended.

<The Ninth Embodiment>

In the above-described seventh embodiment, the discrimination between a black bar and white bar in a bar code is performed by the threshold value (127) of density. However, it can be arranged that, in the case where there is the value of density which is in out of a predetermined range, it is determined that there is a strong possibility that the bar code has been forged and the whole operation of the apparatus is suspended.

More particularly, it is predetermined that the density of a white bar is in the range of values 0 to 50 and that of a black bar is in the range of values 200 to 255. If there is a bar in which the density value is out of the predetermined ranges, it is determined that there is a strong possibility that the bar code has been forged and the whole operation of the apparatus is suspended.

<The Tenth Embodiment>

In the seventh embodiment, the discrimination between the black bar and white bar is performed on the density of green by a single threshold value (127). However, it can be arranged that the discrimination is performed on all color component signals, that is, the three colors of red, blue, green. In the case where the bar code having the value of density which is not in the predetermined ranges, it is judged that there is a strong possibility that the bar code has been forged. Accordingly, all operations of the apparatus are suspended and the direction to call a copy maintenance engineer can be displayed on the operation section.

More particularly, since a bar code is normally printed in black on a white ground, in each of the density signals of magenta, yellow, cyan which are made based on red, green, blue, it can be predetermined that the density from 0 to 50 is a white bar and from 200 to 255 is a black bar. If there is a bar in which the density is out of the predetermined ranges, it is determined that there is a strong possibility that the bar code has been forged and the whole operation of the apparatus is suspended.

The operation for reading a bar code by the 3-color density signals can be performed when the operation that the signal CNO is set to as "0" and the operation that the image of the bar code is written in the RAM 915 in the seventh embodiment is similarly performed for the signal CNO=1 and the signal CNO=2.

<The Eleventh Embodiment>

In the above-described seventh embodiment, in the case where a bar code is read and the pattern which is not a predetermined pattern exists, it is judged that there is a strong possibility that the bar code has been forged. Accordingly, all operations of the apparatus are suspended and the direction to call a copy maintenance engineer can be displayed on the operation section.

<The Twelfth Embodiment>

In the seventh embodiment, the pattern is read when the main switch is turned on. However, it can be arranged that the pattern is read every time copying is designated.

In each of the embodiments described above, a laser-beam printer is taken as an example of the printing apparatus. However, this does not impose a limitation upon the invention, for the invention is applicable also to an ink-jet printer and a thermosensitive printer. In particular, the invention is applicable to a so-called bubble-jet printer employing a head of the type which jets droplets by utilizing film boiling that relies upon thermal energy.

In each of the foregoing embodiments, the patterns are added in yellow. However, this does not impose a limitation upon the invention, for the color can be replaced by a neutral tint such as yellow green or grey or a bight color such as light purple or light green.

Furthermore, in each of the foregoing embodiments, the image of an original is inputted by the scanning section. However, this does not impose a limitation upon the invention, for it is permissible to input an image entered by a still-video camera or ordinary video camera, as well as an image produced by computer graphics.

It goes without saying that the present invention includes a case where more than two of the embodiments described above are combined.

The present invention is not limited to the above-descried embodiments but can be modified in various ways within the scope of the claims.

It should be noted that the present invention may be applied to a system composed of a plurality of devices or to an apparatus comprising one device. It goes without saying that the present invention can be applied also to a case where the above-mentioned effects are attained by supplying a program to a system or apparatus.

What is claimed is:

1. An image processing apparatus comprising:
    image reading means for reading an original, and for generating image data;
    a member, which holds predetermined information, placed in the apparatus in a position to be read by said image reading means; and
    addition means for adding a predetermined pattern based on the predetermined information to an image represented by the image data generated by said image reading means,
    wherein the predetermined information corresponds to identification information unique to an individual apparatus.

2. The apparatus according to claim 1, wherein said image reading means includes a linear sensor for generating the image data.

3. The apparatus according to claim 1, wherein said member represents a bar code.

4. The apparatus according to claim 1, wherein said member is placed in an almost undetachable position of the apparatus.

5. The apparatus according to claim 1, wherein the identification information is a manufacturer's serial number.

6. The apparatus according to claim 1, wherein said addition means repeatedly adds the pattern at a predetermined interval.

7. An image processing apparatus comprising:
    image reading means for reading an original, and for generating image data;
    a member, which holds identification information corresponding to said apparatus, placed in said apparatus at a position to be read by said image reading means; and
    control means for controlling the apparatus in accordance with the identification information read from said member,
    wherein the identification information is unique to an individual apparatus.

8. The apparatus according to claim 7, wherein said image reading means includes a linear sensor for generating the image data.

9. The apparatus according to claim 8, wherein said member is represents a bar code arranged in the same direction as the sensing direction in the linear sensor.

10. The apparatus according to claim 8, wherein said member is represents a bar code arranged in a direction perpendicular to the sensing direction in the linear sensor.

11. The apparatus according to claim 7, wherein said member is placed in an almost undetachable position of the apparatus.

* * * * *

UNITED STATES PATENT AND TRADEMARK OFFICE
CERTIFICATE OF CORRECTION

PATENT NO. : 5,541,741
DATED : July 30, 1996
INVENTOR(S) : TAKASHI SUZUKI

It is certified that error appears in the above-indentified patent and that said Letters Patent is hereby corrected as shown below:

ON THE COVER PAGE,
  Item
  [56] References Cited

U.S. PATENT DOCUMENTS

"Wagetsuma et al." should read --Wagatsuma et al.--.
  Item
  [56] FOREIGN PATENT DOCUMENTS "289047  4/1988  Euro. Pat. Off.
    342060  5/1989  Euro. Pat. Off." should read
      --289047 11/1988 Euro. Pat. Off.
        342060 11/1989 Euro. Pat. Off.--.

Column 3

Line 20, "includes" should read --include----.
  Line 45, "in a" (second occurrence) should be deleted.

Column 7

Line 13, "output ted." should read --outputted.--.
  Line 33, "which has gone through a spatial"
       should read --which has gone through a spatial--.
  Line 34, "filter." should read --filter.--.

Column 8

Line 53, "is" (second occurrence) should be deleted.

UNITED STATES PATENT AND TRADEMARK OFFICE
CERTIFICATE OF CORRECTION

PATENT NO. : 5,541,741     Page 2 of 3
DATED : July 30, 1996
INVENTOR(S) : TAKASHI SUZUKI It is certified that error appears in the above-indentified patent and that said Letters Patent is hereby corrected as shown below:

Column 9

Line 14, "line)." should read --lines.).--.
Line 24, "used copying machine" should read
    --the copying machine used,--.

Column 10

Line 31, "distinct" should read --distinguish--.
Line 47, "forgery" should read --*forgery*--.
Line 53, "the" (first occurrence) should be deleted.

Column 11

Line 57, "a" should read --the--.

Column 12

Line 18, "it" should be deleted.
Line 46, "signal" should read --*signal*--.

Column 13

Line 2, "37" should be deleted.
Line 11, "distinct." should read --distinguished.--.
Line 14, "the" (first occurrence) should be deleted.
Line 25, "25 ," should read --25,--.
Line 41, "signal CLK." should read *signal CLK.*--.

UNITED STATES PATENT AND TRADEMARK OFFICE
CERTIFICATE OF CORRECTION

PATENT NO. : 5,541,741
DATED : July 30, 1996
INVENTOR(S) : TAKASHI SUZUKI

It is certified that error appears in the above-indentified patent and that said Letters Patent is hereby corrected as shown below:

Column 16

Line 44, "is" should be deleted.
Line 47, "is" should be deleted.

Signed and Sealed this

Eleventh Day of March, 1997

Attest:

BRUCE LEHMAN

Attesting Officer

Commissioner of Patents and Trademarks